(12) United States Patent
Suh et al.

(10) Patent No.: US 9,681,191 B2
(45) Date of Patent: *Jun. 13, 2017

(54) METHOD OF PROCESSING NON-REAL TIME SERVICE AND BROADCAST RECEIVER

(71) Applicant: LG ELECTRONICS INC., Seoul (KR)

(72) Inventors: Jong Yeul Suh, Seoul (KR); Gomer Thomas, Arlington, WA (US); Jin Pil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 11 days.

This patent is subject to a terminal disclaimer.

(21) Appl. No.: 14/491,725

(22) Filed: Sep. 19, 2014

(65) Prior Publication Data

US 2015/0046961 A1  Feb. 12, 2015

Related U.S. Application Data

(63) Continuation of application No. 12/966,455, filed on Dec. 13, 2010, now Pat. No. 8,869,216.

(Continued)

(51) Int. Cl.
*H04N 5/445* (2011.01)
*H04N 21/472* (2011.01)
(Continued)

(52) U.S. Cl.
CPC ...... *H04N 21/47208* (2013.01); *H04H 20/40* (2013.01); *H04H 40/09* (2013.01);
(Continued)

(58) Field of Classification Search
CPC .... H04H 20/40; H04H 20/93; H04H 2201/16; H04H 40/09; H04H 60/72;
(Continued)

(56) References Cited

U.S. PATENT DOCUMENTS 8,073,955 B1   12/2011   Gagnon et al.
8,099,752 B2 *  1/2012   Eyer .................... H04N 21/235
                                                              725/40

(Continued)

FOREIGN PATENT DOCUMENTS

KR   10-2009-0096336 A   9/2009
KR   10-2009-0112684 A   10/2009
WO      2009-125961 A1   10/2009

*Primary Examiner* — Nathnael Aynalem
(74) *Attorney, Agent, or Firm* — Dentons US LLP

(57) ABSTRACT

A method of processing a non-real time service of a broadcast receiver, which receives and processes a service being transmitted in non-real time, and a broadcast receiver are disclosed. Herein, the method of processing a non-real time service in a broadcast receiver includes receiving in non-real time first signaling information including access information of a content item and second signaling information including detail information of the content item, receiving in non-real time a file belonging to the content item by accessing to a FLUTE session transmitting the content item, wherein the file corresponds to a compressed file that has one or more files including an entry file compressed therein, and decompressing the compressed file and then executing the content item referring to information on the entry file.

10 Claims, 17 Drawing Sheets

Related U.S. Application Data

(60) Provisional application No. 61/286,350, filed on Dec. 14, 2009.

(51) Int. Cl.
| | | |
|---|---|---|
| *H04H 20/40* | (2008.01) | |
| *H04H 40/09* | (2008.01) | |
| *H04N 21/433* | (2011.01) | |
| *H04N 21/442* | (2011.01) | |
| *H04N 21/4335* | (2011.01) | |
| *H04N 21/462* | (2011.01) | |
| *H04N 21/643* | (2011.01) | |
| *H04N 21/81* | (2011.01) | |
| *H04N 21/432* | (2011.01) | |
| *H04N 21/44* | (2011.01) | |
| *H04N 21/61* | (2011.01) | |

(52) U.S. Cl.
CPC ......... *H04N 21/432* (2013.01); *H04N 21/433* (2013.01); *H04N 21/4331* (2013.01); *H04N 21/4335* (2013.01); *H04N 21/44* (2013.01); *H04N 21/44209* (2013.01); *H04N 21/4622* (2013.01); *H04N 21/6125* (2013.01); *H04N 21/64322* (2013.01); *H04N 21/8126* (2013.01)

(58) Field of Classification Search
CPC ........... H04N 21/2362; H04N 21/4331; H04N 21/4345; H04N 21/44209; H04N 21/47208; H04N 21/8583; H04N 21/235; H04N 21/2353; H04N 21/4622; H04N 21/8126; H04N 21/435; H04N 21/84
USPC ........................................ 375/240.01–240.29
See application file for complete search history.

(56) References Cited

U.S. PATENT DOCUMENTS

| | | | |
|---|---|---|---|
| 8,520,057 B2 * | 8/2013 | Lee ................ | H04H 20/57 348/42 |
| 8,819,702 B2 | 8/2014 | Paila | |
| 2002/0169971 A1 | 11/2002 | Asano et al. | |
| 2005/0160184 A1 * | 7/2005 | Walsh ................ | H04L 12/1868 709/247 |
| 2007/0186005 A1 * | 8/2007 | Setlur ................ | G06F 17/2247 709/231 |
| 2008/0115148 A1 * | 5/2008 | Paila ................ | H04H 60/13 719/316 |
| 2008/0189601 A1 | 8/2008 | Goldman | |
| 2009/0185562 A1 * | 7/2009 | Kannan ............. | H04L 12/1886 370/389 |
| 2010/0095021 A1 * | 4/2010 | Samuels ............ | H04L 12/5695 709/235 |
| 2010/0309387 A1 * | 12/2010 | Eyer ................ | H04N 21/235 348/731 |

* cited by examiner

FIG. 5

| Syntax | No.of Bits | Format |
|---|---|---|
| NRT_service_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     NST_protocol_version | 8 | uimsbf |
|     reserved | 8 | '11111111' |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_NRT_services | 8 | uimsbf |
|   for (j=0;j< num_NRT_services; j++) | | |
|   { | | |
|     NRT_service_id | 16 | uimsbf |
|     reserved | 2 | '11' |
|     NRT_service_status | 2 | uimsbf |
|     SP_indicator | 1 | bslbf |
|     short_NRT_service_name_length /* m */ | 3 | uimsbf |
|     short_NRT_service_name | 16*m | |
|     reserved | 2 | '11' |
|     NRT_service_category | 6 | uimsbf |
|     num_components | 5 | uimsbf |
|     IP_version_flag | 1 | bslbf |
|     source_IP_address_flag | 1 | bslbf |
|     NRT_service_destination_IP_address_flag | 1 | bslbf |
|     if (source_IP_address_flag) | | |
|       source_IP_address | 32 or 128 | uimsbf |
|     if (NRT_service_destination_IP_address_flag) | | |
|       NRT_service_destination_IP_address | 32 or 128 | uimsbf |
|     for (j=0;j< num_components; j++) | | |
|     { | | |
|       reserved | 1 | '1' |
|       essential_component_indicator | 1 | bslbf |
|       component_destination_IP_address_flag | 1 | bslbf |
|       port_num_count | 5 | uimsbf |
|       component_destination_UDP_port_num | 16 | uimsbf |
|       if (component_destination_IP_address_flag) | | |
|         component_destination_IP_address | 32 or 128 | uimsbf |
|         reserved | 4 | '1111' |

FIG. 6

| | | |
|---|---|---|
| num_component_level_descriptors<br>for (k=0;k< num_components_level_descriptors; k++)<br>{<br>    component_level_descriptor()<br>}<br>}<br>reserved<br>num_NRT_service_level_descriptors<br>for (m=0; m<num_NRT_service_level_descriptors; m++)<br>{<br>    NRT_service_level_descriptor()<br>}<br>}<br>reserved<br>num_virtual_channel_level_descriptors<br>for (n=0; n<num_virtual_channel_level_descriptors; n++) {<br>{<br>    virtual_channel_level_descriptor()<br>}<br>} | 4<br><br><br>var<br><br><br>4<br>4<br><br><br>var<br><br><br>4<br>4<br><br><br>var | uimsbf<br><br><br><br><br><br>'1111'<br>uimsbf<br><br><br><br><br><br>'1111'<br>uimsbf |

FIG. 7

| Syntax | No.of Bits | Format |
|---|---|---|
| NRT_component_descriptor() { | | |
|     descriptor_tag | 8 | 0 x CB |
|     descriptor_length | 8 | uimsbf |
|     component_type | 7 | uimsbf |
|     component_encryption_flag | 1 | |
|     if (component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     NRT_component_data(component_type) | var | |
| } | | |

FIG. 8

| Syntax | No.of Bits | Format |
|---|---|---|
| NRT_component_ data() { | | |
|    TSI | 16 | uimsbf |
|    session_start_time | 32 | uimsbf |
|    session_end_time | 32 | uimsbf |
|    reserved | 5 | '11111' |
|    tias_bandwidth_indicator | 1 | bslbf |
|    as_bandwidth_indicator | 1 | bslbf |
|    FEC_OTI_indicator | 1 | bslbf |
|    if (tias_bandwidth_indicator == '1') { | | |
|       tias_bandwidth | 16 | uimsbf |
|    } | | |
|    if (as_bandwidth_indicator == '1') { | | |
|       as_bandwidth | 16 | uimsbf |
|    } | | |
|    if (FEC_OTI_indicator == '1') { | | |
|      FEC_encoding_id | 8 | uimsbf |
|      FEC_instance_id | 16 | uimsbf |
|    } | | |
| } | | |

FIG. 9

| Syntax | No.of Bits | Format |
|---|---|---|
| NRT_information_table_section() { | | |
|   table_id | 8 | 0xDF |
|   section_syntax_indicator | 1 | '0' |
|   private_indicator | 1 | '1' |
|   reserved | 2 | '11' |
|   section_length | 12 | uimsbf |
|   table_id_extension { | | |
|     protocol_version | 8 | uimsbf |
|     subnet_id | 8 | uimsbf |
|   } | | |
|   reserved | 2 | '11' |
|   NRT_IT_version_number | 5 | uimsbf |
|   current_next_indicator | 1 | '1' |
|   section_number | 8 | uimsbf |
|   last_section_number | 8 | uimsbf |
|   service_id | 16 | uimsbf |
|   time_span_start | 32 | uimsbf |
|   reserved | 5 | '11111' |
|   time_span_length | 11 | uimsbf |
|   num_content_items_in_section | 8 | uimsbf |
|   for (j=0;j< num_content_items_in_section; j++) { | | |
|     content_linkage | 32 | uimsbf |
|     updates_available | 1 | bslbf |
|     TF_available | 1 | bslbf |
|     content_security_conditions_indicator | 1 | bslbf |
|     available_on_internet | 1 | bslbf |
|     playback_length_included | 1 | bslbf |
|     playback_delay_included | 1 | bslbf |
|     expiration_included | 1 | bslbf |
|     content_length_included | 1 | bslbf |
|     reserved | 4 | '1111' |
|     acquisition_time | 12 | uimsbf |
|     if (playback_length_included==1) { | | |
|       reserved | 4 | '1111' |
|       playback_length_in_seconds | 20 | uimsbf |
|     } | | |
|     if (playback_delay_included==1) { | | |
|       reserved | 4 | '1111' |
|       playback_delay | 20 | uimsbf |
|     } | | |
|     if (expiration_included==1) { | | |
|       expiration | 32 | uimsbf |
|     } | | |
|     if (content_length_included==1) { | | |
|       content_length | 40 | uimsbf |
|     } | | |
|     content_name_length | 8 | uimsbf |
|     content_name_text() | var | |
|     num_content_descriptors | 8 | uimsbf |
|     for (i=0; i<num_content_descriptors; i++) { | | |
|       content_descriptor() | var | |
|     } | | |
|   } | | |
|   num_descriptors | 8 | uimsbf |
|   for (i=0; i<num_descriptors; i++) { | | |
|     descriptor() | var | |
|   } | | |
| } | | |

FIG. 10

```
<?xml version="1.0" encoding="UTF-8"?>
<xs:schema xmlns="urn:atsc:nrt:flute:fdt:2009" xmlns:xs="http://www.w3.org/2001/XMLSchema"
targetNamespace="urn:atsc:nrt:flute:fdt:2009"elementFormDefault="qualified">
  <xs:element name="FDT-Instance" type="FDT-InstanceType"/>
  <xs:complexType name="FDT-InstanceType">
    <xs:sequence>
      <xs:element name="File" type="File-Type" maxOccurs="unbounded"/>
      <xs:element name="FDT-ContentLinkage" type="xs:usignedShort" minOccurs="0" maxOccurs="unbounded"/>
      <xs:any namespace="##other" processContents="skip" minOccurs="0" maxOccurs="unbounded"/>
    </xs:sequence>
    <xs:attribute name="Expires" type="xs:string" use="required"/>
    <xs:attribute name="Complete" type="xs:boolean" use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="File-Type">
    <xs:sequence>
      <xs:element name="File-ContentLinkage" type="ContentLinkage Type" minOccurs="0" maxOccurs="unbounded"/>
      <xs:any namespace="##other" processContents="skip" minOccurs="0" maxOccurs="unbounded"/>
    </xs:sequence>
    <xs:attribute name="Content-Location" type="xs:anyURI" use="required"/>
    <xs:attribute name="TOI" type="xs:positiveInteger" use="required"/>
    <xs:attribute name="Content-Length" type="xs:unsignedLong" use="required"/>
    <xs:attribute name="Transfer-Length" type="xs:unsignedLong" use="optional"/>
    <xs:attribute name="Content-Type" type="xs:string" use="optional"/>
    <xs:attribute name="Content-Encoding" type="xs:string" use="optional"/>
    <xs:attribute name="Content-MD5" type="xs:base64Binary" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="ContentLinkage Type">
    <xs:attribute name="ContentLinkage" type="xs:unsingedShort" use="required"/>
    <xs:attribute name="entry" type="xs:boolean" default="false" use="optional"/>   ①
    <xs:anyAttribute processContents="skip"/>
  </xs:complexType>
</xs:schema>
```

FIG. 11

```xml
<?xml version="1.0" encoding="UTF-8"?>
<xs:schema xmlns="urn:atsc:nrt:flute:fdt:2009" xmlns:xs="http://www.w3.org/2001/XMLSchema"
targetNamespace="urn:atsc:nrt:flute:fdt:2009" elementFormDefault="qualified">
  <xs:element name="FDT-Instance" type="FDT-InstanceType"/>
  <xs:complexType name="FDT-InstanceType">
    <xs:sequence>
      <xs:element name="File" type="File-Type" maxOccurs="unbounded"/>
      <xs:element name="FDT-ContentLinkage" type="FDT-ContentLinkage Type" minOccurs="0" maxOccurs="unbounded"/> ①
      <xs:any namespace="##other" processContents="skip" minOccurs="0" maxOccurs="unbounded"/>
    </xs:sequence>
    <xs:attribute name="Expires" type="xs:string" use="required"/>
    <xs:attribute name="Complete" type="xs:boolean" use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="File-Type">
    <xs:sequence>
      <xs:element name="File-ContentLinkage" type="ContentLinkage Type" minOccurs="0" maxOccurs="unbounded"/>
      <xs:any namespace="##other" processContents="skip" minOccurs="0" maxOccurs="unbounded"/>
    </xs:sequence>
    <xs:attribute name="Content-Location" type="xs:anyURI" use="required"/>
    <xs:attribute name="TOI" type="xs:positiveInteger" use="required"/>
    <xs:attribute name="Content-Length" type="xs:unsignedLong" use="required"/>
    <xs:attribute name="Transfer-Length" type="xs:unsignedLong" use="optional"/>
    <xs:attribute name="Content-Type" type="xs:string" use="optional"/>
    <xs:attribute name="Content-Encoding" type="xs:string" use="optional"/>
    <xs:attribute name="Content-MD5" type="xs:base64Binary" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="FDT-ContentLinkage Type">
    <xs:sequence>
      <xs:element name="Entry-Content-Location" type="xs:anyURI" minOccurs="0" maxOccurs="unbounded"/> ②
    </xs:sequence>
    <xs:attribute name="ContentLinkage" type="xs:unsingedShort" use="required"/>
    <xs:anyAttribute processContents="skip"/>
  </xs:complexType>
  <xs:complexType name="ContentLinkage Type">
    <xs:attribute name="ContentLinkage" type="xs:unsingedShort" use="required"/>
    <xs:attribute name="entry" type="xs:boolean" default="false" use="optional"/>
    <xs:anyAttribute processContents="skip"/>
  </xs:complexType>
</xs:schema>
```

| Syntax | No.of Bits | Format |
|---|---|---|
| Entry_file_descriptor () { | | |
| descriptor_tag | 8 | 0×TBD |
| descriptor_length | 8 | uimsbf |
| filename_length | 16 | uimsbf |
| for (i=0; i<filename_length; i++) { | | |
| filename[i] | 8 | bslbf |
| } | | |
| } | | |

FIG. 14

| Offset | Bytes | Description |
|---|---|---|
| ☐ 0 | 4 | Local file header signature = 0×04034b50 |
| ☐ 4 | 2 | Version needed to extract (minimum) |
| ☐ 6 | 2 | General purpose bit flag |
| ☐ 8 | 2 | Compression method |
| 10 | 2 | File last modification time |
| 12 | 2 | File last modification date |
| 14 | 4 | CRC - 32 |
| 18 | 4 | Compressed size |
| 22 | 4 | Uncompressed size |
| 26 | 2 | File name length (n) |
| 28 | 2 | Extra field length (m) |
| 30 | n | File name |
| 30+n | m | Extra field |

FIG. 15

| Offset | Bytes | Description |
|---|---|---|
| ☐0 | 4 | Central directory file header signature = 0×02014b50 |
| ☐4 | 2 | Version made by |
| ☐6 | 2 | Version needed to extract (minimum) |
| ☐8 | 2 | General purpose bit flag |
| 10 | 2 | Compression method |
| 12 | 2 | File last modification time |
| 14 | 2 | File last modification date |
| 16 | 4 | CRC - 32 |
| 20 | 4 | Compressed size |
| 24 | 4 | Uncompressed size |
| 28 | 2 | File name length (n) |
| 30 | 2 | Extra field length (m) |
| 32 | 2 | File comment length (k) |
| 34 | 2 | Disk number where file starts |
| 36 | 2 | Internal file attributes |
| 38 | 4 | External file attributes |
| 42 | 4 | Relative offset of local file header |
| 46 | n | File name |
| 46+n | m | Extra field |
| 46+n+m | k | File comment |

METHOD OF PROCESSING NON-REAL TIME SERVICE AND BROADCAST RECEIVER

This application is a continuation of U.S. patent application Ser. No. 12/966,455 filed Dec. 13, 2010, which claims the benefit of U.S. Provisional Application No. 61/286,350 filed Dec. 14, 2009, both of which are fully incorporated by reference as if fully set forth herein.

BACKGROUND OF THE INVENTION

The Field

The present disclosure relates to a method for processing non-real time service and broadcast receiver thereof.

Description of the Related Art

A digital television (DTV) can not only provide video and audio services which are conventional TV services, but can now also provide various other services. For example, the DTV can provide an Electronic Program Guide (EPG) or the like to the user and can simultaneously provide broadcast services received through 2 or more channels. Especially, the number of services that a reception system can provide has been significantly increased since the reception system has been equipped with a large-capacity storage device and has been connected to the Internet or data communication channels which enable bidirectional communication.

SUMMARY OF THE INVENTION

Accordingly, an object of the present invention is to provide a method of receiving and processing non-real time services and a broadcast receiver.

Another object of the present invention is to provide a method for signaling information of an entry file included in a compressed file and a broadcast receiver, when a content item configuring a non-real time service is compressed to a single file.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to an embodiment of the present invention, a method of processing a non-real time service in a broadcast receiver includes the steps of receiving in non-real time first signaling information including access information of a content item and second signaling information including detail information of the content item, receiving in non-real time a file belonging to the content item by accessing to a File Delivery over Unidirectional Transport (FLUTE) session transmitting the content item based on the first signaling information and the second signaling information, herein the file corresponds to a compressed file that has one or more files including an entry file compressed therein, and decompressing the compressed file and then executing the content item referring to information on the entry file.

The information on the entry file mat by received by being included in the second signaling information. At this point, the second signaling information includes a descriptor including the information on the entry file. And the information on the entry file includes a file name of the entry file.

The information on the entry file may be received by being included in the compressed file. At this point, a compression format of the compressed file is a ZIP format, and the information on the entry file is received by being included in a header of the compressed file.

The information on the entry file may be received by being included in a file delivery table (FDT) of the FLUTE session.

The non-real time service may include one or more content items.

In another aspect of the present invention, a broadcast receiver includes a signaling information processor, a receiver, and a service manager. The signaling information processor receives in non-real time first signaling information including access information of a content item and second signaling information including detail information of the content item. The receiving unit receives in non-real time a file belonging to the content item by accessing to a File Delivery over Unidirectional Transport (FLUTE) session transmitting the content item based on the first signaling information and the second signaling information. Herein the file corresponds to a compressed file that has one or more files including an entry file compressed therein. And the service manager decompresses the compressed file and then executes the content item referring to information on the entry file.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 and FIG. 6 illustrate a bitstream syntax structure of a Non-Real Time Service Table (NST) according to the present invention;

FIG. 7 illustrates a bitstream syntax structure of a component_descriptor( ) according to an embodiment of the present invention;

FIG. 8 illustrates a bitstream syntax of FLUTE file delivery data using the component_descriptor( );

FIG. 9 illustrates a bitstream syntax structure of a Non-Real Time Information Table (NRT-IT) according to an embodiment of the present invention;

FIG. 10 and FIG. 11 respectively illustrate an exemplary FDT XML structure signaling entry file information according to embodiments of the present invention;

FIG. 14 illustrates a local file header structure of the ZIP file shown in FIG. 13 according to an embodiment of the present invention;

FIG. 15 illustrates a file header structure in a central directory region of the ZIP file shown in FIG. 13 according to an embodiment of the present invention;

DETAILED DESCRIPTION OF THE INVENTION

Figure 1:
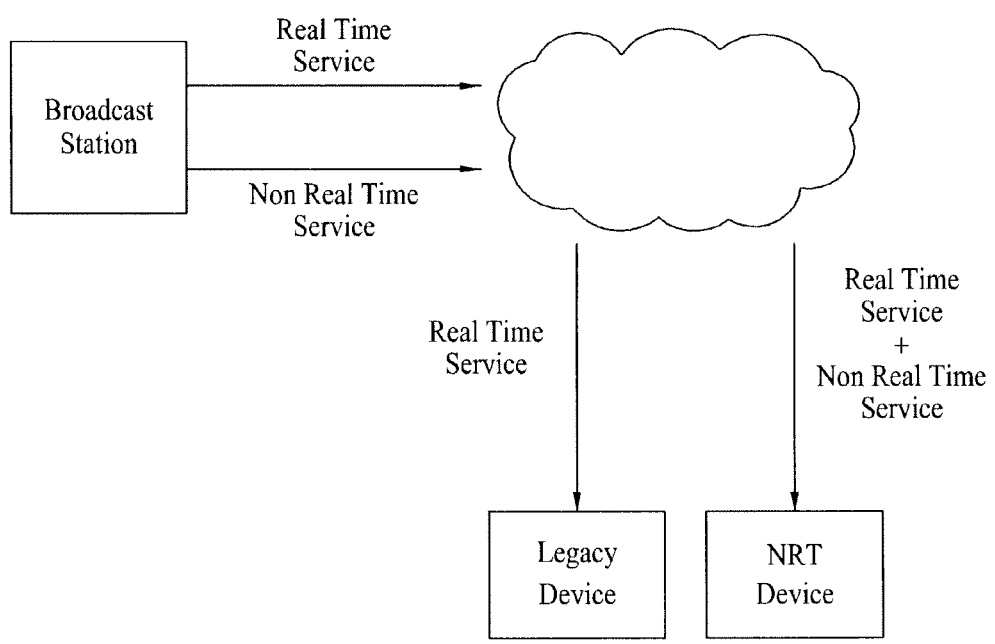
FIG. 1 illustrates a conceptual diagram of providing a real-time (RT) service and a non-real time (NRT) service.

Preferred embodiments of the invention, which can achieve the above objects, will now be described with reference to the accompanying drawings. The configuration and operation of the invention, illustrated in the drawings and described below with reference to the drawings, will be described using at least one embodiment without limiting the spirit and the essential configuration and operation of the invention.

Although most terms of elements in the present invention have been selected from general ones widely used in the art taking into consideration their functions in the invention, the terms may be changed depending on the intention or convention of those skilled in the art or the introduction of new technology. Some terms have been arbitrarily selected by the applicant and their meanings are explained in detail in the following description as needed. Thus, the definitions of the terms used in the invention should be determined based on the whole content of this specification together with the intended meanings of the terms rather than their simple names or meanings.

The term real time (RT) service used in the present invention actually means the real-time service. In other words, it is restricted in time. On the other hand, non-real time (NRT) service refers to non-real time, not RT, service. Thus, NRT service is not restricted in time. Furthermore, the data used in NRT service is referred to as NRT service data.

A broadcast receiver according to the present invention receives NRT service through terrestrial, cable, Internet, and the like.

The NRT service is stored in a storage medium of the broadcast receiver and then it is displayed through a display according to a time specified by the user or at the user's request. The NRT service is received and stored in a file format according to an embodiment. In an embodiment, the storage medium is an internal HDD attached to the inner part of the broadcast receiver. In another embodiment, the storage medium may be Universal Serial Bus (USB) memory or an external HDD connected externally with the broadcast receiver.

In order to receive and store the files configuring the NRT service and provide service to the user, signaling information is needed. The signaling information is referred to NRT service signaling information or NRT service signaling data according to the present invention.

According to the method of receiving IP datagram, NRT service can be divided into Fixed NRT service and Mobile NRT service. More specifically, the Fixed NRT service is provided through fixed broadcast receiver, and Mobile NRT service is provided through mobile broadcast receiver.

According to an embodiment of the present invention, Fixed NRT service is explained in detail. However, the present invention can also be obviously applied to Mobile NRT service as well.

FIG. 1 illustrates a conceptual diagram of how a RT and an NRT service are provided.

The broadcast station, following the conventional method, transmits the current terrestrial broadcast (or mobile broadcast) RT service. At this juncture, the broadcast station may provide NRT service using the extra bandwidth or a specific bandwidth left after sending the RT service. Thus, RT service and NRT service are transmitted through a same or a different channel. Therefore, a broadcast receiver can be divided into RT service and NRT service, and in order to provide the user with the NRT service when needed, NRT service signaling information (or NRT service signaling data) is required. The NRT service signaling information (or NRT service signaling data) will be described below in detail.

For example, a broadcast station can transmit broadcast service data in real time and transmit news clips, weather information, advertisements, push VOD, or the like in non-real time. The NRT service may not only provide such news clips, weather information, advertisements, and push VOD, but may also provide specific scenes, detailed information on specific program, preview (trailer) from a real-time broadcast service.

A conventional broadcast receiver (i.e., a legacy device) can receive and process RT services but cannot receive and process NRT services. Thus, it is a principle that the process of the conventional broadcast receiver (i.e., a legacy device) is not affected by NRT stream included in the transmission of RT service. In other words, the conventional broadcast receiver does not have a method of handling the NRT service even if it is received.

However, the broadcast receiver (i.e., an NRT device) according to an embodiment of the present invention can combine NRT services and RT services to provide a variety of services to the user compared to the convention receiver.

Figure 2:
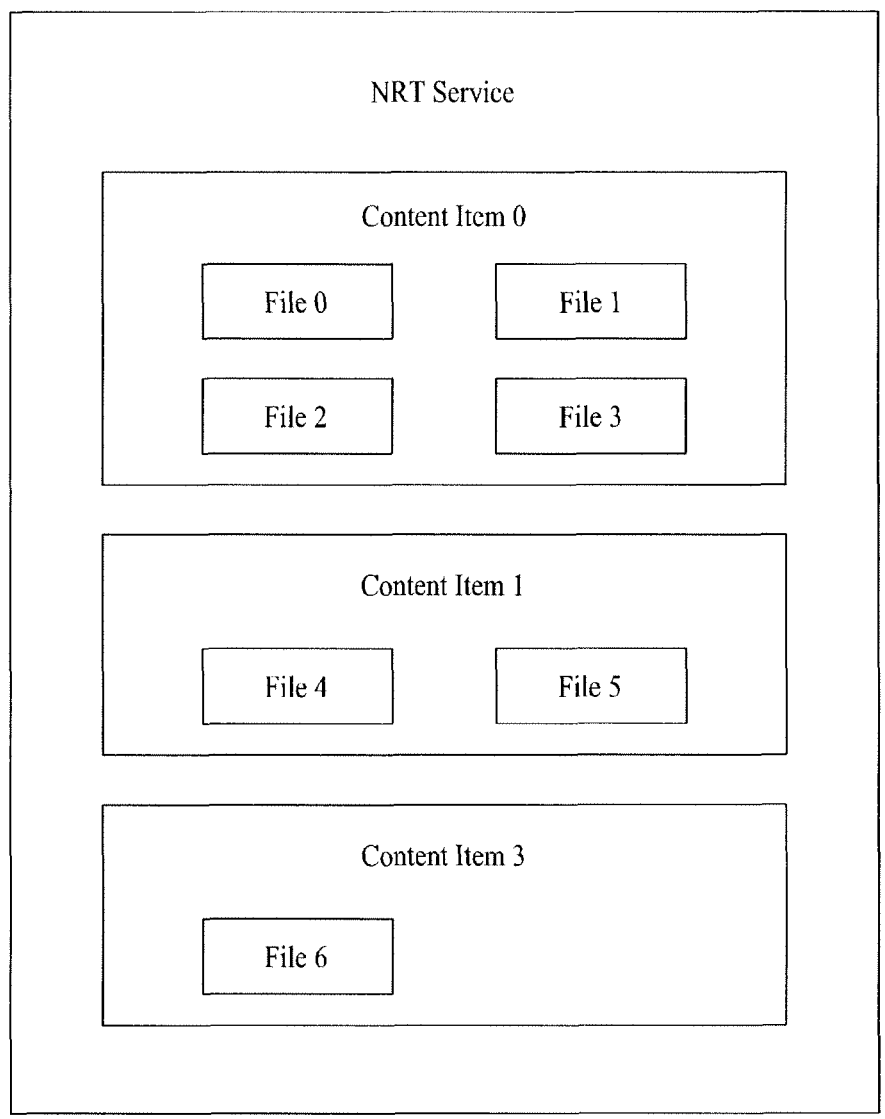
FIG. 2 is a diagram illustrating the relationship between an NRT service, content item, and files.

In an embodiment, one NRT service according to the present invention includes one or more content item (or content or NRT content) and one content item includes one or more files as shown in FIG. 2. The terms "file" and "object" have the same meaning in the description of the present invention.

The content item is the minimum unit that can be presented independently. For example, when a news program, which includes an economic news section, a political news section, and a life news section, is provided in non-real time, the news program may be an NRT service and each of the economic news section, the political news section, and the life news section may be the content item. And each of the economic news section, the political news section, and the life news section may include at least one file.

The NRT service can be transmitted in an MPEG-2 Transport Stream (TS) packet format through a dedicated broadcast channel or the same broadcast channel as the RT service. In this case, a unique PID is transmitted after being allocated to a TS packet of the NRT service data in order to identify the NRT service. In an embodiment of the present invention, IP-based NRT service data is packetized into an MPEG-2 TS packet for transmission.

The NRT service signaling data required to receive the NRT service data is transmitted through an NRT service signaling channel. The NRT service signaling channel is transmitted through a specific IP stream in the IP layer. Here, the IP stream is also packetized into an MPEG-2 TS packet for transmission. The NRT service signaling data transmitted through an NRT service signaling channel includes NRT Service Map Table (NST) and NRT Information Table (NRT-IT). In an embodiment of the present invention, the NST provides the access information of at least one NRT service and at least one content item/file that forms NRT services that operate in the IP layer. In one embodiment of the present invention, NRT-IT provides detailed information of the content item/file that forms NRT service. In the present invention, the NST and the NRT-IT may be referred to as Signaling Information Table.

Figure 3:
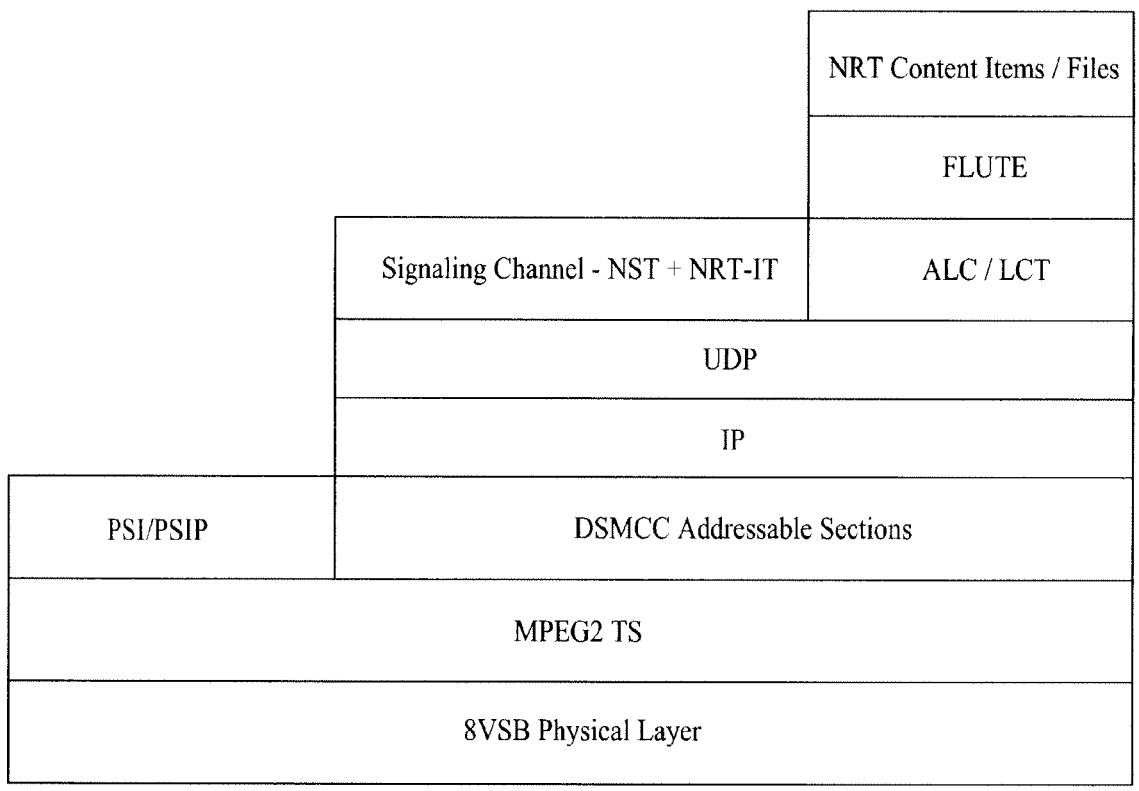
FIG. 3 illustrates an embodiment of a protocol stack for a fixed NRT service according to the present invention.

FIG. 3 illustrates a diagram for a protocol stack of an NRT service configured according to an embodiment of the present invention.

In an embodiment of the present invention, for fixed NRT service, the file-type NRT service is packetized according to an IP scheme in the IP layer and then transmitted through a specific virtual channel in an MPEG-2 TS format.

In an embodiment of the present invention, as an example of the MPEG-2 based Program Specific Information/Program and System Information Protocol (PSI/PSIP) table, the presence of the NRT service may be signaled through the virtual channel in the Virtual Channel Table (VCT).

In an embodiment of the present invention, the NRT service signaling channel that transmits NRT service signaling data which signals the access information of the IP based NRT service is transmitted in an MPEG-2 TS format after being packetized according to an IP stream in the IP layer through a specific virtual channel.

More specifically, in the broadcast station, NRT content/files are packetized according to a file transfer protocol scheme and are again packetized according to an Asynchronous Layered Coding/Layered Coding Transport (ALC/LCT) scheme as shown in FIG. 3. The packetized ALC/LCT data is again packetized according to an UDP scheme and the packetized ALC/LCT/UDP data is again packetized into ALC/LCT/UDP/IP data according to an IP scheme. In the present invention, the packetized ALC/LCT/UDP/IP data is referred to as an "IP datagram" for ease of explanation.

In addition, NRT service signaling data required to receive the NRT content/files is transmitted through an NRT service signaling channel. Here, the NRT service signaling channel is packetized according to a User Datagram Protocol (UDP) scheme and the packetized UDP data is again packetized into UDP/IP data according to an IP scheme. In the present invention, the UDP/IP data is also referred to as an "IP datagram" for ease of explanation. In an embodiment, multicast of the NRT service signaling channel is achieved after being encapsulated in an IP datagram having a well-known IP destination address and a well-known destination UDP port number.

In an embodiment of the present invention, IP datagrams of the NRT service signaling channel and the NRT service are encapsulated in an addressable section structure and again packetized in an MPEG-2 TS format. So, one addressable section structure has a format in which a section header and a CRC checksum are added to one IP datagram. This addressable section structure format complies with a Digital Storage Media Command and Control (DSM-CC) section format for private data transmission. Thus, the addressable section is also referred to as a "DSM-CC addressable section." A 188-byte MPEG-2 TS packet can be created by dividing the addressable section data into 184-byte units and adding a 4-byte MPEG header to each 184-byte unit. At this time, a value allocated to a PID of the MPEG header is a unique value that can identify TS packets that carry the NRT service signaling channel and the NRT service.

Program Specific Information (PSI) and Program and System Information Protocol (PSIP) table section data is also packetized into MPEG-2 TS packets.

An embodiment of the PSI table may include a Program Map Table (PMT), a Program Association Table (PAT), or the like and an embodiment of the PSIP table may include a Virtual Channel Table (VCT), a System Time Table (STT), a Rating Region Table (RRT), an Extended Text Table (ETT), a Direct Channel Change Table (DCCT), a Direct Channel Change Selection Code Table (DCCSCT), an Event Information Table (EIT), and a Master Guide Table (MGT).

The MPEG-2 TS packets are modulated according to a predetermined transmission scheme, for example, a VSB transmission scheme, in a physical layer and are then transmitted to the reception system.

In an embodiment of the present invention, the transmission of an NRT service is determined by signaling through a PSI/PSIP table. For example, whether or not an NRT service is transmitted is signaled in a Virtual Channel Table (VCT).

According to an embodiment of the present invention, the present invention uses a service type field within the VCT so as to signal whether or not an NRT service is being transmitted. According to an embodiment of the present invention, the service_type field is assigned with a value of '0x08', thereby indicating that one or more NRT services are being transmitted to the respective virtual channel.

Figure 4:
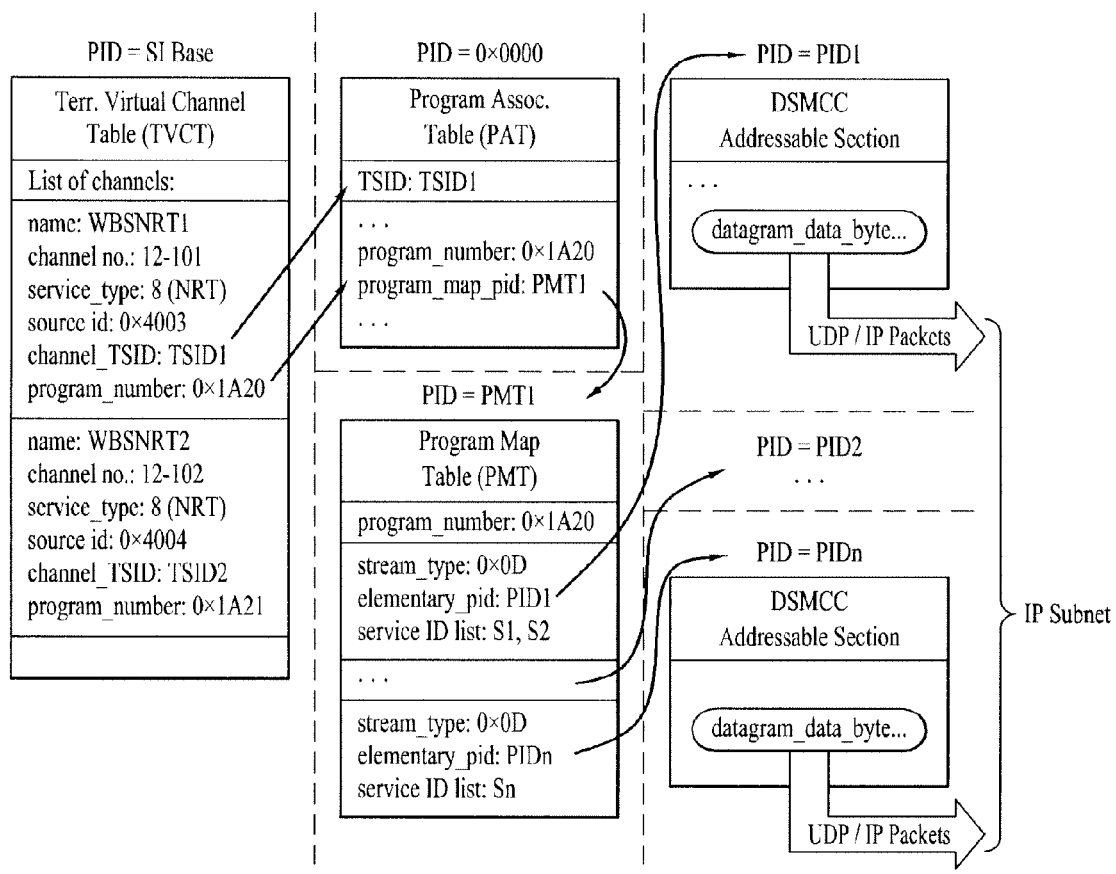
FIG. 4 illustrates an embodiment of a procedure for obtaining access information of an IP stream that carries an NRT service and an NRT service signaling channel using a PSI/PSIP table according to the present invention.

FIG. 4 illustrates NRT service signaling data and a procedure for extracting NRT service signaling data.

According to the embodiment of the present invention, in FIG. 4, the value of '0x08' is assigned to the service_type field within the VCT, thereby indicating that one or more NRT services are being transmitted to the respective virtual channel.

More specifically, when the power of the receiver is turned on, and when a channel is selected by default or by a user, a VCT and a PMT are acquired from the broadcast signal that is being received to the selected channel. Then, by parsing the acquired VCT, the system determines whether or not an NRT service exists. This information may be known by verifying a service_type field value within a virtual channel loop of the VCT.

For example, if the value of the service_type field is not equal to '0x08', the corresponding virtual channel does not transmit the NRT service. At this point, since the virtual channel transmits the conventional service (i.e., a legacy ATSC service), the receiver performs the adequate operations in accordance with the information included in the virtual channel.

If the value of the service_type field is equal to '0x08', the corresponding virtual channel transmits an NRT service. In this case, a PID of a Program Map Table (PMT) is extracted from a Program Association Table (PAT) having a channel_TSID field value and a program_number field value within the VCT. Subsequently, the PMT may be obtained by grouping (or gathering) MPEG-2 TS packets having the extracted PID and removing the header of each MPEG-2 TS packet. And, the NRT service signaling channel and the PID of the TS packet transmitting the NRT service are extracted from the PMT.

Thereafter, when the MPEG-2 TS packets corresponding to the extracted PID are received and decapsulated, i.e., when the MPEG-2 header is removed, a DSM-CC addressable section including the NRT service signaling channel or the NRT service is recovered.

Subsequently, after removing section header and CRC checksum from the DSM-CC addressable section, IP datagram transmitting the NRT service signaling channel is recovered, and the NRT service signaling data is obtained from the recovered IP datagram. At this time, the access information of the IP datagram transmitting the NRT service signaling channel is received from a well-known destination IP address and well-known destination UDP port number.

Based on the extracted NRT service signaling data, NRT service data, i.e., NRT content item/files can be received and stored in a storage unit or can be displayed through a display.

In an embodiment, the NRT service signaling data transmitted through the NRT service signaling channel may include NRT Service Map Table (or Service Table: NST) and NRT Information Table (NRT-IT).

In an embodiment, IP datagrams of the NST and NRT-IT has the same well-known IP address and well-known UDP port number. Therefore, the determination of NST and NRT-IT included in the NRT service signaling data is done through table identifier. Thus, the table identifier can be the table_id of the corresponding table or the header of the table section, and when necessary, table_id_extension can be referred to in order to identify the table.

NRT Service Map Table (NST)

The NST provides access information of the NRT service. In an embodiment, the NST has a similar table to the MPEG-2 Private section format.

The NST provides access information of IP based NRT services included in the virtual channel. For example, the NST provides access information of each FLUTE sessions that configures one NRT service.

Here, whether one NST is configured with one session or plurality of sessions is determined through the table_id field, section_number field, last_section_number field, and the like. And the table may be completed by removing the IP header and the UDP header of the IP datagrams of the NRT service signaling channel and gathering sections having the same table identifier. For example, by gathering the sections having table identifier allocated for NST, the NST is completed.

FIG. 5 and FIG. 6 illustrate a bitstream syntax structure of an NST section according to an embodiment of the present invention. The detail of each field of the NST section is explained in the following.

Although the syntax is written in an MPEG-2 private section format for better understanding, the data may be in any format. For example, it is possible to use another method in which the syntax is expressed in a Session Description Protocol (SDP) format and is then signaled through a Session Announcement Protocol (SAP).

In FIG. 5 and FIG. 6, a table_id field includes an 8-bit unsigned integer number that indicates the type of table section being defined in NRT Service Table (NST).

A section_syntax_indicator is a 1-bit field that shall be set to '0' to always indicate that this table is derived from the "short" form of the MPEG-2 private section table.

A private_indicator (1-bit) indicates whether the type of the corresponding section follows the private section type or not. (This field that shall be set to '1')

A section_length is a 12-bit field. It specifies the number of remaining bytes this table section immediately following this field. The value in this field shall not exceed 4093 (0xFFD)).

A table_id_extension field is a 16-bit field and is table-dependent. It shall be considered to be logically part of the table_id field providing the scope for the remaining fields. The table_id_extension field includes NST_protocol_version fields.

The NST_protocol_version field is an 8-bit unsigned integer field whose function is to allow, in the future, this NST to carry parameters that may be structured differently than those defined in the current protocol. At present, the value for the NST_protocol_version field shall be zero. Non-zero values of NST_protocol_version may be used by a future version of this standard to indicate structurally different tables.

A version_number field (5-bit) indicates the version number of the NST.

A current_next_indicator field is a one-bit indicator, which when se to '1' shall indicate that the NST sent is currently applicable. When the bit is set to '0', it shall indicate that the table sent is not yet applicable and will be the next table to become valid. This standard imposes no requirement that "next" tables (those with current_next_indicator set to '0') must be sent. An update to the currently applicable table shall be signaled by incrementing the version_number_field).

A section_number field is an 8-bit field that shall give the section number of this NST section. The section_number field of the first section in an NST shall be '0x00'. The section_number field shall be incremented by 1 with each additional section in the NST.

A last_section_number field is an 8-bit field that shall give the number of the last section (i.e., the section with the highest section_number) of the NST of which this section is a part).

A num_NRT_services field is an 8-bit field that specifies the number of services in this NST section.

A 'for' loop, which is also referred to as an "NRT service loop", is executed for the number of times as the number of NRT services corresponding to the num_NRT_services field value in providing signaling information of a plurality of NRT services. Thus, signaling information of the corresponding NRT service is indicated for each of the NRT services included in the NST section. Here, the following field information may be provided for each NRT service.

An NRT_service_id field is a 16-bit unsigned integer number that shall uniquely identify this NRT service within the scope of this NRT section. The NRT_service_id field of a service shall not change throughout the life of the service. To avoid confusion, it is recommended that if a service is terminated, then the NRT_service_id field for the service should not be used for another service until after a suitable interval of time has elapsed.

An NRT_service_status field is a 2-bit enumerated field that shall identify the status of this NRT Service. The most significant bit shall indicate whether this NRT Service is active (when set to '1') or inactive (when set to '0') and the least significant bit shall indicate whether this NRT Service is hidden (when set to '1') or not (when set to '0'). Hidden services are normally used for proprietary applications, and ordinary receiving devices should ignore them.

A SP_indicator field is a 1-bit field that indicates when set to 1, service protection is applied to at least one of the components needed to provide a meaningful presentation of this NRT Service.

A Short_NRT_service_name_length field (3-bit) instructs the number of byte pairs within the Short_NRT_service_name field.

A Short_NRT_service_name filed (16*m bit) indicates a short name of the NRT service. This field may be filled with null data (for example, 0x00) when the NRT service has no short name.

An NRT_service_category field is a 6-bit enumerated type field that shall identify the type of service carried in the NRT.

A num_components field is a 5-bit field that specifies that number of IP stream components in this NRT Service.

An IP_version_flag is a 1-bit indicator, which when set to '0' shall indicate that source_IP_address, NRT_service_destination_IP_address, and component_destination_IP_address fields are IPv4 addresses. The value of '1' for this field is reserved for possible future indication that source_IP_address, NRT_service_destination_IP_address, and component_destination_IP_address fields are for IPv6.

A source_IP_address_flag field is a 1-bit Boolean flag that shall indicate, when set, that a source IP address value for this NRT Service is present to indicate a source specific multicast.

An NRT_service_destination_IP_address_flag field is a 1-bit Boolean flag that indicates, when set to '1', that an NRT_service_destination_IP_address field value is present, to serve as the default IP address for the components of this NRT Service.

A source_IP_address field is a 32 or a 128 bit field that shall be present if the source_IP_address_flag field is set to '1' and shall not be present if the source_IP_address_flag field is set to '0'. If present, this field shall contain the source IP address of all the IP datagrams carrying the components of this NRT Service. The conditional use of the 128 bit-long address version of this field is to facilitate possible use of IPv6 in the future, although use of IPv6 is not currently defined.

An NRT_service_destination_IP_address field is a 32 or a 128 bit field that shall be present if the NRT_service_destination_IP_address_flag field is set to '1' and shall not be present if the NRT_service_destination_IP_address field is not present, then the component_destination_IP_address field shall be present for each component in the num_components loop. The conditional use of the 128 bit-long address version of this field is to facilitate possible use of IPv6 in the future, although use of IPv6 is not currently defined.

A 'for' loop, which will also be referred to as a "component loop," is executed as much as the number of times as the number of components corresponding to the num_components field value to provide access information of a plurality of components. This provides access information of each component included in the NRT service. Here, the following field information may be provided for each component. In an embodiment, one component corresponds to one FLUTE file delivery session (or FLUTE session). More specifically, files belonging to one content item are transmitted through one or more FLUTE file delivery sessions. The one or more FLUTE file delivery sessions are components of a service associated to the content item.

An essential_component_indicator field is a 1-bit indicator which, when set to '1', shall indicate that this component is an essential component for the NRT Service. Otherwise, this field indicates that this component is an optional component.

A port_num_count is a 6-bit field that shall indicate the number of destination UDP ports associated with this UDP/IP stream component. The values of the destination UDP port numbers shall start from the component_destination_UDP_port_num field and shall be incremented by one.

A component_destination_IP_address_flag field is a 1-bit Boolean flag that shall indicate, when set to '1', that the component_destination_IP_address field is present for this component.

A component_destination_IP_address field (32 or 128 bit) shall be present if the component_destination_IP_address_flag field is set to '1' and shall not be present if the component_destination_IP_address_flag field is set to '0'. When this field is present, the destination address of the IP datagrams carrying this component of the NRT Service shall match the address in this field. When this field is not present, the destination address of the IP datagrams carrying this component shall match the address in the NRT_service_destination_IP_address field. The conditional use of the 128 bit-long address version of this field is to facilitate possible use of IPv6 in the future, although use of IPv6 is not currently defined.

A component_destination_UDP_port_num field is a 16-bit unsigned integer field that represents the destination UDP port number for this UDP/IP stream component.

A num_component_level_descriptors field (4-bit) indicates the number of descriptors providing the additional information of the component level.

The same number of the component_level_descriptor( ) is included in the component loop providing additional information as the number of the field value of the num_component_level_descriptors.

A num_NRT_service_level_descriptors field (4-bit) indicates the number of descriptors that provide additional information about the NRT service level.

The same number of the NRT_service_level_descriptor( ) are included in NRT service loop as the number of the field value of num_NRT_service_level_descriptors to provide additional information about the NRT service.

A num_virtual_channel_level_descriptors field (4-bit) indicates the number of descriptors which provides additional information about the virtual channel level.

The same number of virtual_channel_level_descriptor( ) included in the virtual channel loop as the number of the field value of the num_virtual_channel_level_descriptors to provide additional information of the virtual channel.

FIG. 7 illustrates an embodiment of a bitstream syntax structure of a component_level_descriptors( ). The component_descriptor( ) is used as one of the component level descriptor component_level_descriptors( ) of the NST and describes additional signaling information of the corresponding component.

The following is a description of each field of the component_descriptor( ).

In FIG. 7, a descriptor_tag field (8-bit) is a descriptor identifier and it can be set as an identifier that identifies the component_descriptor( ).

A descriptor_length field (8-bit) describes the remaining length of the descriptor starting after the descriptor_length field and to the end of this descriptor, in bytes.

A component_type field (7-bit) shall identify the encoding format of the component. The value may be any of the values assigned by IANA for the payload_type of an RTP/AVP stream, or it may be any of the values assigned by ATSC, or it may be a "dynamic value" in the range 96-127. For components consisting of media carried via RTP, the value of this field shall match the value in the payload_type field in the RTP header of the IP stream carrying this component. Note that additional values of the component_type field in the range of 43-71 can be defined in future versions of this standard.

A component_encryption_flag (1-bit) informs whether the corresponding component is encrypted or not.

A Num_STKM_streams field (8-bit) indicates the number STKM streams if component_encryption_flag has been encrypted. (The num_STKM_streams field (8-bit) is an 8-bit unsigned integer field that shall identify the number of STKM streams associated with this component.

A STKM_stream_id field (8-bit) is repeated as much as the field value of Num_STKM_streams and indicates a value that identifies a STKM stream that can acquire a key required for decryption.

An NRT_component_data (component_type) element provides the encoding parameters and/or other parameters necessary for rendering this component. The structure of the component_data is determined by the value of component_type field.

For example, if the component_type field value is then NRT_component_data (component_type) field provides component data for H.264/AVC video stream.

In another example, if the component_type field value is 38 then NRT_component_data (component_type) field provides data for FLUTE file delivery as shown in FIG. 8.

One NRT service can be included in multiple FLUTE sessions. Thus, one NRT service may be configured with plurality of FLUTE sessions. In other words, files belonging to one content item are transmitted through one or more FLUTE session. Each FLUTE session may be signaled using NRT_component_data( ) as shown in FIG. 8.

FIG. 8 illustrates an example of the bitstream syntax structure of NRT_component_data( ) that provides data for FLUTE file delivery according to the present invention. The following explains each field in the NRT_component_data( ).

A TSI field (16-bit unsigned integer) shall be the Transport Session Identifier (TSI) of FLUTE session.

A session_start_time field (16-bit) indicates the start time of the FLUTE session. If the field values are all '0', then it can be interpreted that the FLUTE session has already begun.

A session_end_time field (16-bit) indicates the end time of the FLUTE session. If the field values are all '0,' then it can be interpreted that the FLUTE session continues for unlimited amount of time.

A tias_bandwidth_indicator field (1-bit) flags the inclusion of TIAS bandwidth information. This bit shall be set to '1' to indicate the TIAS bandwidth field is present, and it shall be set to '0' to indicate the TIAS bandwidth field is absent.

An as_bandwidth_indicator field (1-bit) flags the inclusion of AS bandwidth information. This bit shall be set to '1' to indicate the AS bandwidth field is present, and it shall be set to '0' to indicate the AS bandwidth field is absent.

A FEC_OTI_indicator field (1-bit) indicates whether FEC Object Transmission Information is provided.

A tias_bandwidth field (16-bit) exists when the as_bandwidth_indicator field value is set to '1' and it indicates the maximum bandwidth. Also, it shall be one one-thousandth of the Transport Independent Application Specific maximum bandwidth as defined in RFC 3890, rounded up to the next highest integer if necessary. This gives the TIAS bandwidth in kilobits per second.

An as_bandwidth field (16-bit) exists when the as_bandwidth_indicator field value is set to '1' and it indicates the maximum AS bandwidth. Also, this value shall be the Application Specific maximum bandwidth as defined in RFC 4566. This gives the AS bandwidth in kilobits per second.

A FEC_encoding_id field exits when the FEC_OTI_indicator field value is set to '1' and indicates FEC ID used in corresponding FLUTE session. (FEC encoding ID used in this FLUTE session, as defined in RFC 3926).

A FEC_instance_id field exists when the FEC_OTI_indicator field value is set to '1' and indicates FEC instance ID used in the corresponding FLUTE session. (FEC instance ID used in this FLUTE session, as defined in RFC 3926).

The information necessary to receive FLUTE session is provided by signaling the parameters through the NRT_component_data( ) of the component_descriptor( ) within the component loop.

In other words, according to the time information set by the session_start_time field and the session_end_time field, the corresponding FLUTE session is opened and files and the FDT (File Description Table) that describes the signaling information of the files that configures NRT service (or content) is received. The FDT is used to transmit the list of all the content items, and also provides information necessary in acquiring content item and the files included in the content item.

For example, each file configuring a content item may be identified by using a Content-Location indicated in an FDT of a FLUTE session. The Content-Location indicates an identifier that can identify the corresponding file. Herein, the Content-Location is configured in an any URI (Uniform Resource Identifier) format. More specifically, the Content-Location value is a locator including the file name.

At this point, a content linkage identifying the corresponding content item may be allocated (or assigned) for each file level or instance level of the FDT. In this case, each file may be identified by using content linkage, transfer object identifier (TOI), and Content-Location values indicated in the FDT of the FLUTE session. Herein, the content linkage corresponds to an identifier that can identify the content item, and the TOI corresponds to an identifier that can identify a transport object, i.e., file being transmitted through the FLUTE session. For example, when the TOI value is equal to '0', the file corresponds to the FDT. More specifically, the TOI value of each file configuring the content item is greater than '0'.

NRT Information Table (NRT-IT)

FIG. 9 is a bitstream syntax of an NRT-IT section according to an embodiment of the present invention.

The bit-stream syntax of the NRT-IT section is described in MPEG-2 Private section format for ease of understanding the bit-stream syntax of the NRT-IT section, but the format of the data can be in other formats as well. For example, signaling through Session Announcement Protocol (SAP) described by Session Description Protocol (SDP) type is also possible.

An NRT-IT of NRT service signaling data according to an embodiment of the present invention announces and describes content items included in an NRT service. Furthermore, one content item is identified by a content_linkage field value within the NRT-IT.

Here, the determination whether one NRT-IT is configured through one section or plurality of sections can be known through the table_id field, section_number field, last_section_number field, and the like, within the NRT-IT section. And the table may be completed by removing the IP header and the UDP header of the IP datagrams of the NRT service signaling channel and gathering sections having the same table identifier. For example, by gathering the sections having table identifier allocated for NRT-IT, the NRT-IT is completed.

The detailed description of the NRT-IT section fields illustrated in FIG. 9 described below.

A table_id field (8-bit) is set to 0xTBD to identify this table section as belonging to the Non-Real-Time Information Table.

A section_syntax_indicator field (1 bit) is set to '0' to always indicate that this table is derived from the "short" form of the MPEG-2 private section table.

A private_indicator field (1 bit) is set to '1'.

A section_length field (12-bit) specifies the number of remaining bytes this table section immediately following this field.

A table_id_extension field (16-bit) is table-dependent. It is considered to be logically part of the table_id field providing the scope for the remaining fields. The table_id_extension field includes protocol_version field and subnet_id field. The protocol_version field (8-bit) is set to zero. The function of protocol_version field is to allow, in the future, this table type to carry parameters that may be structured differently than those defined in the current protocol. At present, the only valid value for protocol_version field is zero. Non-zero values of protocol_version field may be used by a future version of this standard to indicate structurally different tables. The subnet_id field (8-bit) indicates the IP subnet associated with this service signaling channel.

An NRT_IT_version_number field (5-bit) indicates the version number of this NRT-IT instance, where NRT-IT instance is defined as the set of one or more NRT_information_table_section( ) having common values for service_id field, current_next_indicator field, protocol_version field, and time_span_start field. The version number is incremented by 1 modulo 32 when any field in the NRT-IT instance changes.

A current_next_indicator field (1-bit) is always set to '1' for NRT-IT sections; the NRT-IT sent is always currently applicable.

A section_number field (8-bit) gives the section number of this NRT-IT section, where the NRT-IT is identified by the combination of table_id, table_id_extension, service_id and time_span_start fields. The section_number of the first section in an NRT-IT is 0x00. The section_number is incremented by 1 with each additional section in the NRT-IT.

A last_section_number field (8-bit) gives the number of the last section (i.e., the section with the highest section_number) of the NRT-IT of which this section is a part.

A service_id field (16-bit) specifies the service_id field associated with the NRT service offering content items described in this section.

A time_span_start field (32-bit) represents the start of the time span covered by this instance of the NRT-IT, expressed as the number of GPS seconds since 00:00:00 UTC, Jan. 6, 1980. The time of day of time_span_start field is aligned to minute 00 of the hour. The value zero for time_span_start field indicates the time period covered by his NRT-IT instance began in the indefinite past. The value of time_span_start field is the same for each section of a multi-sectioned NRT-IT instance. The values of time_span_start field and time_span_length field are set such that the specified time span does not overlap with any other NRT-IT instance in this IP subnet.

A time_span_length field (11-bit) indicates the number of minutes, starting at the time indicated by time_span_start field, covered by this instance of the NRT-IT. Once established, the value of time_span_length field for a given value of time_span_start field does not change. A value of time_span_length field of zero means this NRT-IT instance covers all time starting at time_span_start field into the indefinite future. If the value of time_span_start is zero, time_span_length field has no meaning. The value of time_span_length field is the same for each section of a multi-sectioned NRT-IT instance. The values of time_span_start field and time_span length field are set such that the specified time span does not overlap with any other NRT-IT instance in this IP subnet.

A num_items_in_section field (8-bit) indicates the number of content items described in this NRT-IT section.

The 'for' loop (also referred to as content item loop) is executed for number of content items corresponding to the value of the num_items_in_section field and provides signaling information about plurality of content items. Thus, the signaling information of the content item of each content item included in the NRT service corresponding to the service_id field value is indicated. The following describes the field in each content item that may provide the information.

The content_linkage field is a 32-bit field having a value ranging from 0x0001 to 0xFFFF. The content_linkage field indicates an identification number of the corresponding content (or content item). Herein, the value 0x0000 is not used. The content_linkage field performs two linkage functions. One linkage function is to link the metadata included in an NRT-IT with at least one or more files included in an FLUTE FDT, which is associated with the NRT service. The other linkage function is to form a TF_id field, i.e., an identifier for a Text Fragment in a Text Fragment Table. The value of the content_linkage field corresponds to one of the values of the FDT-Content-Linkage elements or to one of the values of the File-Content-Linkage elements within the FLUTE FDT for each of the files associated with the content item. The precedence rules may be applied when matching each content_linkage value with the corresponding content linkage elements in the FLUTE FDT.

An updates_available field (1-bit) indicates whether the corresponding content item is updated. For example, when the content item is included in an NRT service that is ended after once service, the field is set to '0'. When the content item is one more updated, the field is set to '1'. That is, the updates_available field specifies, when set to '1,' that the referenced content item(s) will be updated. When the updates_available field is set to '0,' updates are not expected to be provided for the associated content item(s), and broadcast receivers are not expected to look for them.

A TF_available field is Boolean flag, this field specifies, when set to '1' that a Text Fragment is present in a Text Fragment Table in the service signaling channel. When the field is set to '0,' no Text Fragment is included in the service signaling channel for this content item.

A content_security_conditions_indicator field (1-bit) indicates, when set to '1', that content protection is applied to at least one of the files that constitute this content item.

An available on internet field (1-bit) is set to '1', it indicates that all the files that constitute this content item are available over the Interaction Channel, and that the Content-Location attribute in the FLUTE FDT for each file belonging to this content item is the URL of that file. When this field is set to '0', it conveys no information about whether or not the files that constitute this content item are available over the Interaction Channel.

A playback_length_in_seconds field (20-bit) specifies the duration of playback of the content, in seconds. For content consisting only of text and/or still images, the value zero is used. For content that includes audio or audio/video content, the playback_length_in_seconds field indicates the playback length of the audio or audio/video content.

A playback_delay_included field is Boolean flag, this field indicates, when set to '1,' that the playback_delay field is present in this iteration of the "for" loop. Setting this field to '0' indicates the playback_delay field is not present in this iteration of the "for" loop.

An expiration_included field is Boolean flag, this field indicates, when set to '1,' that the expiration field is present in this iteration of the "for" loop. Setting this field to '0' indicates the expiration field is not present in this iteration of the "for" loop.

A content_length_included field is Boolean flag, this field indicates, when set to '1,' that the content_length field is present in this iteration of the "for" loop. Setting this field to '0' indicates the content_length field is not present in this iteration of the "for" loop.

A duration field (12-bit) in the range 1 to 2880 specifies the expected cycle time, in minutes, of the carousel containing the referenced content item. A broadcast receiver is expected to use the duration parameter to determine the amount of time needed to capture the referenced content.

A content_length field (40-bit), when present, represents the total size in bytes of the content item or items. This item is used by the broadcast receiver to determine if enough memory is available to store it before downloading is attempted.

An acquisition_time field (12-bit) specifies the expected cycle time, in minutes, of the carousel containing the referenced content item. A receiver is expected to use the acquisition_time parameter to determine the amount of time needed to capture the referenced content.

A playback_length_in_seconds field (20-bit) specifies the duration of playback of the content, in seconds. For content not intended to be presented on a timeline, the value zero is used. For content that includes audio or audio/video content, the playback_length_in_seconds indicates the playback length of the audio or audio/video content.

A playback_delay field (20-bit) counts of the number of seconds following reception of the first byte of the associated content the broadcast receiver waits before playback may start, while buffering the incoming stream. A value of zero indicates playback may commence immediately. When playback_delay field is not provided, the broadcast receiver is expected to retrieve the complete file or file set prior to playback.

An expiration field (32-bit) represents the expiration time of the content, expressed as the number of GPS seconds since 00:00:00 UTC, 6 Jan. 1980. Following expiration, the content is deleted from memory. If an expiration time is not specified, receivers are expected to use methods of their own choosing to manage memory resources.

A content_length field (40-bit), when present, represents the total size in bytes of the content item or items. This content item is used by the receiving device to determine if enough memory is available to store it before downloading is attempted. The content_length field is present when content_length_included is set to '1' and absent otherwise. When content_length is not present in a given iteration of the "for" loop, the length of the content described in that iteration is the value specified in the default_content_length field in the NRT_service_info_descriptor( ), if present in the NST.

A content_name_length field is an 8-bit field, which indicates the total length of the subsequent content_nam-e_text( ) field in byte units. The content_name_text( ) field specifies a title of a corresponding content (or content item) in a multiple string structure (MSS).

A num_content_descriptors field is a 8-bit field, which indicates the total length of the subsequent content_descriptor( ) field in byte units.

The content_descriptor( ) field corresponds to a descriptor providing additional information on a content level, the content_descriptor( ) field being individually applied to each content (or content item).

A num_descriptors field is a 8-bit field, which indicates the total length of the subsequent descriptor( ) field in byte units.

The descriptor( ) field is commonly applied to all contents (or content items) being described in the current NRT-IT section.

Meanwhile, one content item is configured of one or more files, and one or more files may be compressed and transmitted in the form of one compressed file.

A plurality of compression formats may be applied in the present invention. A file extension of the compressed file may vary depending upon the compression format that is used. According to the embodiment of the present invention, a ZIP format is used to compress one or more files. However, this is merely exemplary, and, therefore, in addition to the ZIP format, other compression formats, such as rar, cab, ace, arj, bz2, alz, and so on, may also be used in the present invention.

A compressed file compressed by using the ZIP format will be referred to as a ZIP file for simplicity.

And, among the files included in a single content item, at least one file may correspond to an entry file. According to the present invention, among the files configuring the content item, a file corresponding to a file which should be played-back first or a root file which must be executed first in order to access the content item, will be referred to as an entry file. Herein, a content item may not include any entry files or may include one or more entry files.

For example, when it is assumed that a content item is configured in a web page format, and that an index file (index.htm) and a plurality of other related image and text files exist, the index file (index.htm) becomes the entry file.

Regardless of the format of the file, any file included in the content file is included in the present invention. For example, one content item may be configured of MP3 files. In this case, the content item may be configured of a plurality of MP3 files and one or more entry files. In this case, the entry file may correspond to a file including a playback list, track information, and so on.

Therefore, among the plurality of files configuring the content item, a method indicating which file corresponds to the entry file is required.

According to the embodiment of the present invention, an FDT XML (eXtensible Markup Language) schema is used to indicate that a particular file corresponds to the entry file.

FIG. 10 illustrates an exemplary FDT XML schema indicating an entry file according to the present invention.

Referring to FIG. 10, in case an attribute is required to be commonly defined in all of the files declared in an FDT (or FDT instance), the attribute is defined in an FDT instance level. And, in case an attribute is required to be individually defined for each file, the attribute is defined in an FDT file level.

For example, a content linkage may be declared in the FDT instance level. At this point, the declared FDT instance is assigned to all files that are within the corresponding FDT instance. Evidently, this information may be overridden by newly applying a content linkage in a file level. Alternatively, when a specific file also belongs to a content other than the content (or content item) defined in the FDT instance level, such information may be notified by assigning a content linkage in the file level. More specifically, in case a file included in the FDT instance belongs to different contents, and when a content linkage is declared in the file level, this may indicate to which content each file belongs.

The portion marked as number 1 corresponds to the method for indicating whether or not each of the respective files is an entry file. However, since it is not required to perform the process of notifying whether or not a particular file corresponds to the entry file on all of the files, an entry attribute may be omitted. Additionally, in case a default value is false, and in case the entry attribute is omitted, this indicates that the corresponding file is not an entry file. Conversely, when the entry attribute is set to be 'true', this indicates that the corresponding file is an entry file.

As described above, by signaling an entry status in accordance with the group, to which a file belongs, in the file level, a specific file may perform the role of an entry in a specific group and may not perform the role of an entry in another group.

FIG. 11 illustrates another exemplary FDT XML schema indicating an entry file according to the present invention.

In a content linkage definition of the FDT instance level, FIG. 11 may provide a direct reference to files performing the role of an entry file.

In FIG. 11, in order to declare a content linkage in the FDT instance level, an FDT-ContentLinkageType is separately defined as shown in number 1, and this is extended so that a content location of the entry file can be included, as shown in number 2.

This method is advantageous in that entry file configuration information may be directly acquired for each content item.

However, in case a plurality of files is compressed to a ZIP file, and in case an entry file is included in the ZIP file, entry file information cannot be known by using the above-described FDT XML schema.

Therefore, according to another embodiment of the present invention, a method of separately sending an entry file, among the files being included in a single content item, without compressing the entry file may be used. In this case, the entry file information may be indicated by using the above-described FDT XML schema.

For example, it is assumed that each of file A, file B, and file C includes a content item and that file A is the entry file. In this case, file B and file C are compressed to a single ZIP file. Accordingly, the files configuring the content item consists of a ZIP file and file A. And, when the corresponding files are transmitted to the FLUTE session, the entry attribute of the FDT is set to be 'true' for file A and then transmitted. Thus, the content item may be transmitted by using a small capacity (or file size), and the entry file information may be indicated by using the FDT.

At this point, a descriptor is included in the NRT-IT, and it may be indicated in the descriptor that file A corresponds to the entry file. Herein, the inclusion of the descriptor is optional, and, when included, the descriptor may be referred to as an entry file descriptor.

According to yet another embodiment of the present invention, when one or more files included in a single content item are compressed to a ZIP file, and when an entry file is included in the ZIP file, information on the entry file is indicated (or notified) by using an entry file descriptor. At this point, the inclusion of the entry file descriptor in the NRT-IT is mandatory.

Figures 12, 13:
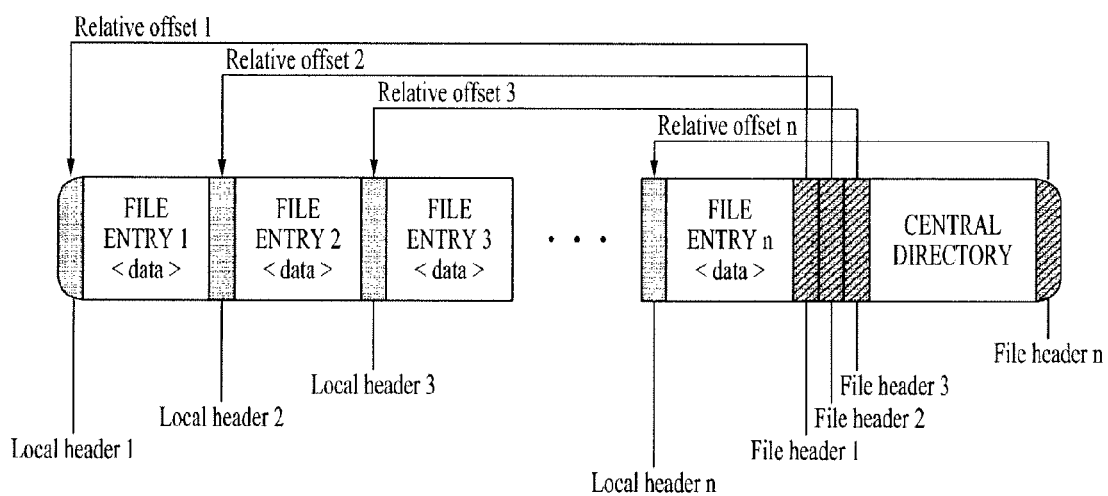
FIG. 12 illustrates a syntax structure of an entry file descriptor signaling entry file information according to an embodiment of the present invention.
FIG. 13 illustrates a ZIP file structure according to an embodiment of the present invention.

FIG. 12 illustrates a syntax structure of an entry file descriptor signaling entry file information according to an embodiment of the present invention.

In FIG. 12, a descriptor_tag field corresponds to an 8-bit descriptor identifier. Herein, the descriptor_tag field is set up with an identifier that can identify an entry file descriptor Entry_file_descriptor( ).

A descriptor_length field is an 8-bit field, which indicates the remaining length of the descriptor starting from the descriptor_length field to the end of the corresponding descriptor in byte units.

A filename_length field is a 16-bit field, which indicates the length of a filename field that follows. More specifically, the filename_length field indicates the number of letters configuring the filename in byte units.

After the filename_length field, a filename(i) field is included in a 'for' loop, which is repeated as many times as the filename_length field value, thereby indicating the name of the entry file. In addition to the entry file name, the filename(i) field may further include path information.

Since it is assumed in the present invention that file A is the entry file, the filename(i) field indicates the name of file A.

According to an embodiment of the present invention, the entry file descriptor is included in a content level descriptor of NRT-IT.

Meanwhile, according to yet another embodiment of the present invention, when one or more files included in a single content item are compressed to a ZIP file, and when an entry file is included in the ZIP file, information on the entry file is indicated (or notified) by using a header within the corresponding ZIP file.

FIG. 13 illustrates a ZIP file format according to an embodiment of the present invention.

The ZIP file format of FIG. 13 is broadly divided into a data region and a central directory (CENTRAL DIRECTORY) region. And, the data region is divided into a number of regions, wherein the number of divided regions corresponds to the number of files included in the ZIP file. Herein, each of the divided regions will be referred to as a file entry region. If 3 files are included in the ZIP file, the data region will be divided into 3 file entry regions.

One file entry region is then divided into a local file header and a local file payload. At this point, each file entry region may further include a data descriptor. Contents of the actual file are stored in a compressed state in the local file payload, and the local file header includes information associated with the file stored in the local file payload. According to the embodiment of the present invention, if the file stored in the local file payload corresponds to an entry file, information showing that the corresponding file is an entry file is indicated in the respective local file header.

The central directory region includes metadata of each file entry region. Herein, the central directory region includes a file header corresponding to each file entry region. The central directory region may further include a digital signature. According to the embodiment of the present invention, a file header corresponding to the file entry region, which stores the entry file, indicates that the corresponding file is an entry file.

And, since the central directory region includes the metadata of each file entry region, the overall ZIP file structure may be identified by simply parsing the central directory region. At this point, each file header of the central directory includes a relative offset of the corresponding local file header, thereby enabling the receiver to quickly search for and find a requested local file.

FIG. 14 illustrates a local file header structure of the ZIP file shown in FIG. 13 according to an embodiment of the present invention.

The local file header of FIG. 14 indicates a local file header signature by using 4 bytes, a version by using 2 bytes, a general purpose status by using 2 bytes, a compression method by using 2 bytes, a last modification file time by using 2 bytes, and a last modification file date by using 2 bytes. Additionally, the local file header also indicates a CRC error correction code by using 4 bytes, a compressed size by using 4 bytes, and an uncompressed size by using 4 bytes. Furthermore, the local file header indicates a file name length by using 2 bytes, an extra field length by using 2 bytes, a file name by using n bytes, and an extra field by using m bytes.

FIG. 15 illustrates a file header structure included in a central directory region of the ZIP file according to an embodiment of the present invention.

The file header of FIG. 15 indicates a local file header signature by using 4 bytes, a first version (version made by) by using 2 bytes, a second version (version needed to extract) by using 2 bytes, a general purpose status by using 2 bytes, a compression method by using 2 bytes, a last modification file time by using 2 bytes, and a last modification file date by using 2 bytes. Additionally, the file header also indicates a CRC error correction code by using 4 bytes, a compressed size by using 4 bytes, and an uncompressed size by using 4 bytes. Furthermore, the file header indicates a file name length by using 2 bytes, an extra field length by using 2 bytes, a file comment length by using 2 bytes, a disk number where the file begins by using 2 bytes, internal file attributes by using 2 bytes, and external file attributes by using 4 bytes. Finally, the file header indicates a relative offset of a local header by using 4 bytes, a file name by using n bytes, an extra field by using m bytes, and a file comment by using k bytes.

According to the embodiment of the present invention, at least one of an extra field of a local file header and an extra field of a file header within the central directory region is used to indicate that the corresponding file is an entry file. For example, if the file included in the first file entry region corresponds to the entry file, the information that the corresponding file is an entry file may be indicated in the extra field of the local file header of the first file entry region. Alternatively, the information that the corresponding file is an entry file may be indicated in the extra field of the file header corresponding to the first file entry region, among the file headers of the central directory region. Furthermore, the information that the corresponding file is an entry file may be indicated in may be simultaneously indicated in the extra field of the local file header of the first file entry region and in the extra field of the file header corresponding to the first file entry region of the central directory region.

In the above description, detailed descriptions are made on exemplary embodiments for signaling entry file information, when an entry file is included in a ZIP file having one or more files included in a single content item compressed therein, with respect to a Fixed NRT service. However, it is apparent that such methods may also be applied to Mobile NRT services.

More specifically, a signaling information table for Mobile NRT services according to the present invention may include a service map table (SMT). An OMA BCAST service guide providing detailed content information may also included as a signaling information table for Mobile NRT services. The SMT corresponds to the NST of the Fixed NRT services, and the OMA BCAST service guide corresponds to the NRT-IT of the Fixed NRT services.

The SMT provides access information of real-time services or non-real time services, which are included in mobile broadcast services and received, and access information of components (or component items) included in each service.

More specifically, in Mobile NRT services, when an entry file is included in a ZIP file having one or more files included in a single content item compressed therein, a file entry descriptor is included in the OMA BCAST service guide so that the entry file information can be signaled. Or, the header of the ZIP file may be used so as to signal the entry file information. Most particularly, in Mobile NRT services also, according to the embodiment of the present invention, at least one of an extra field of a local file header within the respective file entry region of the ZIP file including an entry file and an extra field of a respective file header within the central directory region is used to indicate that the corresponding file is an entry file. For a detailed description of the method, reference may be made to the methods for Fixed NRT services. Therefore, detailed description of the method used in mobile NRT services will be omitted for simplicity.

Figure 16:
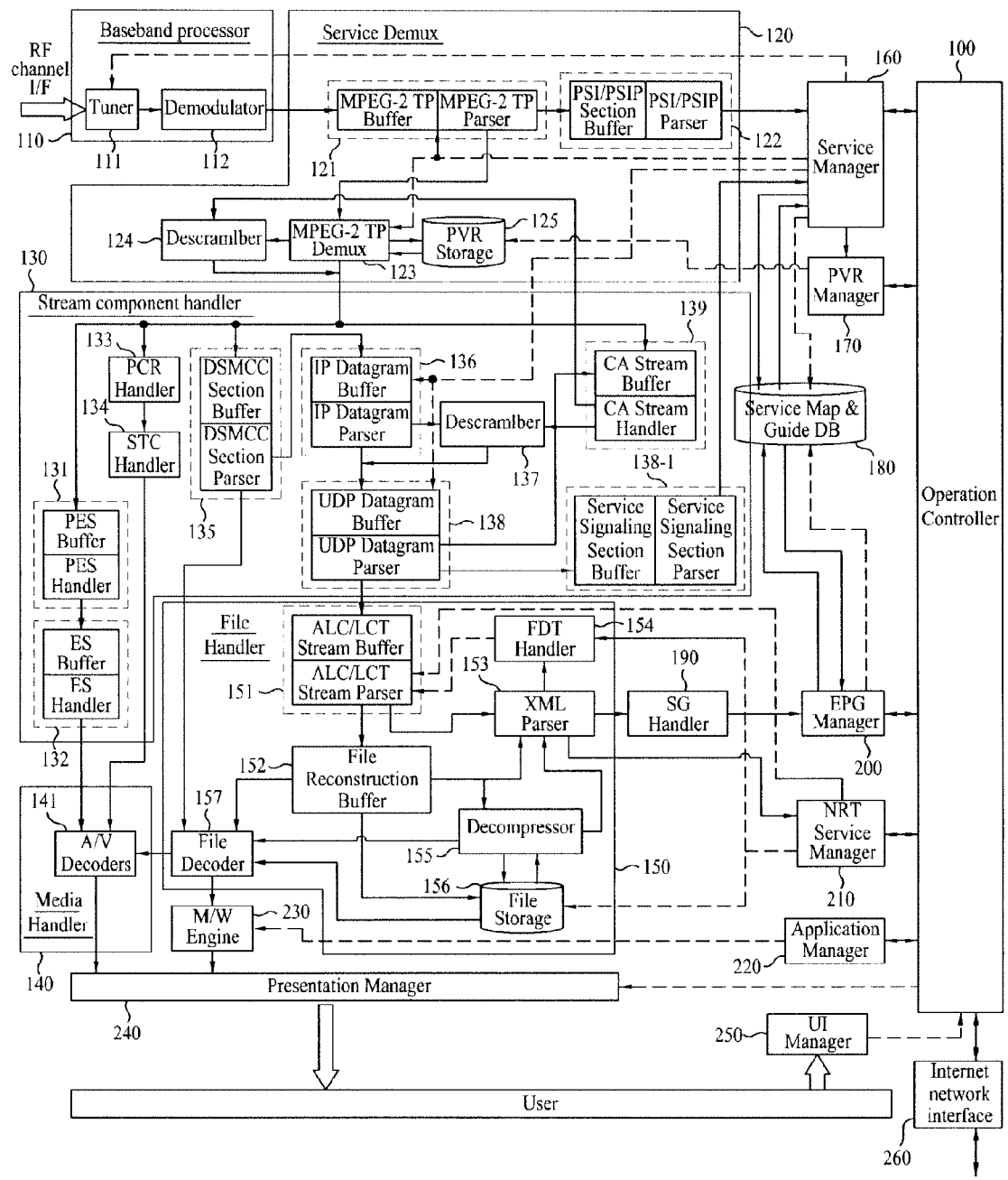
FIG. 16 illustrates a block diagram showing the structure of a broadcast receiver for Fixed NRT services according to an embodiment of the present invention.

FIG. 16 illustrates a block diagram showing a structure of a broadcast receiver for fixed NRT services according to an embodiment of the present invention.

The broadcast receiver in FIG. 16 includes an Operation Controller 100, a Baseband processor 110, a Service Demultiplexer 120, a Stream component handler 130, a Media Handler 140, a File Handler 150, a Service Manager 160, a PVR Manager 170, a first storage unit 180, an SG Handler 190, an EPG Manager 200, an NRT Service Manager 210, an Application Manager 220, a MiddleWare Engine 230, a Presentation Manager 240, a UI Manager 250, and an internet network interface (260).

The Baseband processor 110 includes a Tuner 111 and a Demodulator 112. The Service Demultiplexer 120 includes an MPEG-2 TP Handler 121, a PSI/PSIP Handler 122, a Demultiplexer 123, a Descrambler 124 and a second storage unit 125.

The Stream component handler 130 includes a Packetized Elementary Stream (PES) decoder 131, an Elementary Stream (ES) decoder 132, a PCR Handler 133, an STC Handler 134, a DSM-CC Addressable Section Handler 135, an IP Datagram Handler 136, a Descrambler 137, a UDP Handler 138, a Service Signaling Section Handler 138-1, and a Conditional Access System (CAS) 139.

The Media Handler 140 includes an A/V Decoders 141. The File Handler 150 includes an ALC/LCT Stream Handler 151, a File Reconstruction Buffer 152, an XML Parser 153, an FDT Handler 154, a Decompressor 155, a third storage unit 156, and a File Decoder 157.

The Tuner 111 for example in FIG. 16 detects signal transmitted over the terrestrial system with the control from the Service Manager 160 and tunes only the wanted channel, down converts to Intermediate Frequency (IF), and outputs to the Demodulator 112. The Tuner 111 may receive both real time stream and non-real time stream. In the present invention, non-real time stream is referred to as NRT stream.

The Demodulator 112 receives digital IF signal of pass bandwidth inputted from the Tuner 111 and performs automatic gain control, reconstructs carrier frequencies and timing to convert into baseband signal and equalizes the channel. For example, if the broadcast signal is a VSB modulated signal, a VSB demodulation process is executed for automatic gain control, and reconstructs carrier frequencies and timing. In the Demodulator 112, demodulated and equalized channel data is outputted to the MPEG-2 TP Handler 121 in a MPEG-2 Transport Stream (TS) packet format.

The MPEG-2 TP Handler 121 is configured of an MPEG-2 TP Buffer and an MPEG-2 TP Parser, temporarily stores the Demodulator 112 output and then analyzes TS Header, and outputs to the Demultiplexer 123 if the Demodulator 112 output is a real time A/V TS packet or NRT TS packet and outputs to the PSI/PSIP Handler 122 if the output is a TS packet for PSI/PSIP table. The PSI/PSIP Handler 122 is configured of a PSI/PSIP Section Buffer and a PSI/PSIP Parser, and temporarily stores the outputted TS packet from the MPEG-2 TP Handler 121 to reconstruct the corresponding table from PSI/PSIP Section data included in the payload of TS packet with referencing table identifier and then parse it. At this time, it is possible to find out whether one table is configured by one section or plurality of sections by the table_id field, section_number field, and last_section_number field within the corresponding section. Further, completing the corresponding table is possible by gathering sections having identical table identifiers. For example, it is possible to complete a VCT by gathering the sections having table identifiers allocated to VCT. Also, each of the parsed table information is collected by the Service Manager 160 and then stored in the first storage unit 180. The VCT, PAT, PMT, DST, EIT, ETT and the like, are stored in the first storage unit 180 after going through the process. The Service Manager 160 stores the table information in the first storage unit 180 in the Service Map & Guide DB format.

According to an embodiment of the present invention, a service_type field within the VCT is used to identify a corresponding service as an NRT service (or NRT service signaling channel), and the PAT and PMT are used to extract a PID value of an MPEG-TS packet, which transmits the NRT service (or NRT service signaling channel). Such extraction procedure is performed in the service manager 160 by using the output of the PSI/PSIP handler 122. And, herein, the extracted PID is provided to the MPEG-2 TS handler 121.

The Demultiplexer 123 divides audio TS packet and video TS packet and then outputs to the PES Decoder 131 if the TS packet is real time A/V TS packet and outputs to the DSM-CC Handler 135 if it is an NRT TS packet. Also, the Demultiplexer 123 outputs to the PCR Handler 133 if the TS packet includes Program Clock Reference (PCR) and outputs to the CAS 139 if the TS packet includes Conditional Access (CA) information. The NRT TS packet is divided into TS packet including NRT service data and TS packet including NRT service signaling channel. A unique PID is allocated to identify the NRT service in the TS packet of the NRT service data and the PID of the TS packet including the NRT service signaling channel is extracted using VCT, PAT, and PMT.

The Demultiplexer 123 outputs to the Descrambler 124 if the payload of the inputted TS packet is scrambled and the Descrambler 124 receives descrambling information needed for descrambling (for example, control word used in scrambling) from the CAS 139 and performs descrambling of the TS packet.

The Demultiplexer 123 stores A/V packet of real time from any one of the record, timed-record, or time shift request in the second storage unit 125. The second storage unit 125 is a mass storage device, an example of it can be a HDD. The download (storage) and upload (playing) in the second storage unit 125 is controlled by the PVR Manager 170 or the Service manager 160.

In accordance with a playback request, the demultiplexer 123 separates an audio TS packet and a video TS packet from an A/V TS packet uploaded from the second storage unit 125, thereby outputting the separated TS packets to a PES decoder 131.

The Demultiplexer 123, in order to perform such functions, is controlled by Service Manager 160 and/or PVR Manager 170.

More specifically, when the service_type field value within the VCT indicates that an NRT service (or NRT service signaling channel) is being transmitted, the service manager 160 uses the PAT and the PMT to extract a PID value of an MPEG-TS packet, which transmits the NRT service (or NRT service signaling channel). Then, the service manager 160 outputs the extracted PID value to the MPEG-2 TP handler 121 and the demultiplexer 123.

The demultiplexer 123 outputs the MPEG-2 TS packets, which correspond to the PID outputted from the service manager 160, to the addressable section handler 135.

The PCR is a standard time value used in syncing audio ES and video ES in the A/V Decoder 141. The PCR Handler 133 outputs to STC Handler 134 reconstructed PCR included in the payload of the inputted TS packet. The STC Handler 134 outputs to the A/V Decoder 141 reconstructed System Time Clock (STC) which is the standard clock from the system by the PCR.

The PES Decoder 131 is configured with a PES Buffer and a PES Handler, temporarily stores audio TS packet and video TS packet and removes TS header from each TS packet and reconstructs to audio PES and video PES. The reconstructed audio PES and video PES is outputted to the ES Decoder 132. The ES Decoder 132 is configured with an ES Buffer and an ES Handler, removes each PES header from audio PES and video PES and reconstructs audio ES and video ES which are pure data.

The A/V Decoder 141 uses each decoding algorithms to decode the audio ES and video ES and reconstructs to pre-compressed status and then outputs to the Presentation Manager 240. At this point, depending on the STC, the time sync is executed when audio ES and video ES are decoding. In one example, the audio decoding algorithm may apply at least one of AC-3 decoding algorithm, MPEG 2 audio decoding algorithm, HE AAC decoding algorithm, AAC SBR decoding algorithm, AAC+ decoding algorithm, HE AAC decoding algorithm, AAC SBR decoding algorithm, MPEG surround decoding algorithm, or BSAC decoding algorithm, and the video decoding algorithm may apply at least one of MPEG 2 video decoding algorithm, MPEG 4 video decoding algorithm, H.264 decoding algorithm, SVC decoding algorithm, and VC-1 decoding algorithm.

The CAS 139 is configured with a CA Stream Buffer and a CA Stream Handler, and the TS packet outputted from the MPEG-2 TP Handler 121 or the service protection data reconstructed and outputted from the UDP Datagram Handler 138 is temporarily stored and then reconstruct the needed information (control word used in scrambling) to descramble the stored TS packet or the service protected data. Thus, the CAS 139 acquires necessary information to descramble after extracting the Entitlement Management Message (EMM) and Entitlement Control Message (ECM) included in the payload of the TS packet, and then by analyzing the extracted EMM and ECM. The ECM may include the Control Word (CW) used in scrambling. The CW may be encrypted using the authentication key. The EMM may include authentication key of the corresponding data and the requirements information. The acquired information necessary for descrambling from the CAS 139 will be outputted to the Descramblers 124, 137.

The DSM-CC Section Handler 135 is configured with a DSM-CC Section Buffer and a DSM-CC Section Parser, temporarily stores the TS packet outputted from the Demultiplexer 123 and then reconstructs the addressable section included in the payload of the TS packet, and outputs to the IP Datagram Handler 136 after removing the header and the CRC checksum from the addressable section and then reconstructing the IP Datagram. The IP Datagram Handler 136 is configured with an IP Datagram Buffer and an IP Datagram Parser, and after buffering the IP datagram delivered from the DSM-CC Section Handler 135, extracts and analyzes the header of the buffered IP datagram and then outputs to the UDP Datagram Section Handler 138 after reconstructing the UDP datagram from the payload of the IP datagram.

At this point, if the IP datagram is scrambled, the scrambled UDP datagram is descrambled in the Descrambler 137 and then outputted to the UDP Datagram Handler 138. In one example, the Descrambler 137 gathers information needed for descrambling (for example, control words needed for scrambling) from the CAS 139 and descrambles the UDP datagram and then outputs to the UDP Datagram Handler 138.

The UDP Datagram Handler 138 is configured with UDP Datagram Buffer and UDP Datagram Parser, and after buffering the UDP datagram outputted from the IP Datagram Handler 136 or the Descrambler 137, extracts and analyzes the header of the buffered UDP datagram and reconstructs the data included in the payload of the UDP datagram. At this point, if the reconstructed data is service protection data then it is outputted to the CAS 139 and if it is NRT service signaling data, then it is outputted to the service signaling section handler 138-1, and if it is NRT service data then it is outputted to the ALC/LCT stream handler 151.

In an embodiment, the access information of the IP datagram transmitting NRT service signaling channel is a well-known destination IP address and well-known destination UDP port number.

Therefore, the IP Datagram Handler 136 and UDP Datagram Handler 138 has well-known destination IP multicast address and well-known destination UDP port number, and the IP multicast stream which transmits NRT service signaling channel, extracts the NRT service signaling data and outputs to the Service Signaling Section Handler 138-1.

Additionally, the service signaling section handler 138-1 is configured of a service signaling section buffer and a service signaling section parser. Herein, the service signaling section handler 138-1 recovers and parses NST, as shown in FIG. 5 and FIG. 6, and NRT-IT, as shown in FIG. 9, from the NRT service signaling data, thereby outputting the processed data to a service manager 160. When the NST is parsed, access information of a FLUTE session, which transmits contents/files configuring the NRT service, may be obtained. The information parsed from the NST and the NRT-IT is collected (or gathered) by the service manager 160, thereby being stored in the first storage unit 180. The service manager 160 stores the information extracted from the NST and the NRT-IT in the first storage unit 180 in the form of a service map and a service guide. According to another embodiment of the present invention, the function (or role) of the service manager 160 may be performed by an NRT service manager 210. More specifically, the information parsed from the NST and the NRT-IT may be collected (or gathered) by the NRT service manager 210, so as to be stored in the first storage unit 180.

The ALC/LCT Stream Handler 151 is configured with an ALC/LCT Stream Buffer and an ALC/LCT Stream Parser and after buffering the ALC/LCT structure data outputted from the UDP Datagram Handler 138, analyzes the header and the header extension of the ALC/LCT session buffered from the data. After analyzing the header and the header extension of the ALC/LCT session, if the data transmitted through ALC/LCT session is in XML structure then it is outputted to the XML Parser 153, and if the data is in file structure, it is temporarily stored in the File Reconstruction Buffer 152 and outputted to the File Decoder 157 or stored in the third storage unit 156. If the data transmitted through ALC/LCT session is data for NRT service, the ALC/LCT stream handler 151 gets controlled by the NRT service manager 210. If the data transmitted through ALC/LCT session is compressed, the Decompressor 155 decompresses and outputted to the XML Parser 153, the File Decoder 157, or the third storage unit 156.

The XML Parser 153 analyzes the XML data transmitted through ALC/LCT session and if the analyzed data is filed-based service then it is outputted to the FDT Handler 154 and if it is a data for service guide, then it is outputted to the SG Handler 190.

The FDT Handler 154 analyzes and processes the File Description Table of the FLUTE protocol through the ALC/LCT session. The FDT Handler 154 is controlled by the NRT Service Manager 210 if the received file is for the NRT service.

The SG Handler 190 gathers and analyzes the data for the service guide transmitted in XML structure, and then outputs to the EPG Manager 200.

The File Decoder 157 decodes the file outputted from the File Reconstruction Buffer 152, file outputted from the Decompressor 155, or filed uploaded from the third storage unit 156 using the pre-selected algorithm and outputs to the Middleware (M/W) Engine 230 or to the A/V Decoder 141.

The M/W Engine 230 interprets and executes the application, which is the data of the file structure. Further, through the Presentation Manager 240, the application may be outputted to an output device such as a screen or a speaker. In an embodiment, the M/W Engine 230 is a JAVA platform based M/W Engine.

The EPG Manager 200, depending upon the input from the user, outputs the service guide data after converting into a display format received from the SG Handler 190 to the Presentation Manager 240. The Application Manager 220 manages the handling of the application data received in a file format.

The Service Manager 160 gathers and analyzes the NRT service signaling data transmitted through the NRT service signaling channel or the PSI/PSIP table data and creates a service map and the stores in the second storage unit 125. The Service Manager 160 controls the access information of the NRT service that the user wants and controls the Tuner 111, Demodulator 112, and the IP Datagram Handler 136.

The Operation Controller 100 according to the command from the user through the UI Manager 250, controls at least one of the Service Manager 160, the PVR Manager 170, the EPG Manager 200, the NRT Service Manager 210, the Application Manager 220, and the Presentation Manager 240, and executes the user's command.

The NRT Service Manager 210 manages the NRT Service transmitted in content/file format through the FLUTE session on the IP layer.

The UI Manager 250 delivers the user's input through the UI to the Operation Controller 100.

The Presentation Manager 240 provides the user through a speaker and/or a screen at least one of the audio and video data outputted from the A/V Decoder 141, file data outputted from the M/W Engine 230, or service guide data outputted from the EPG Manager 210.

Meanwhile, according to the embodiment of the present invention, when an entry file is included in a single content item, the FDT is used to signal information on the entry file, as shown in FIG. 10 or FIG. 11. In this case, the FDT handler 154 analyzes the corresponding FDT XML schema, so as to acquire the information on the entry file. The acquired information on the entry file may be stored in one of the first to third storages 125, 180, and 156. And, reference is made to the stored information on the entry file when the respective content item is executed, or when the respective content item is stored and then played-back.

In the present invention, one or more files included in a single content item may be compresses to a ZIP file and transmitted. At this point, according to the embodiment of the present invention, when an entry file is included in the ZIP file, entry file information is signaled by using an entry file descriptor or by using a header of the corresponding ZIP file. Also, according to the embodiment of the present invention, the entry file descriptor is included as a content level descriptor of the respective NRT-IT.

If the entry file information is signaled to the entry file descriptor and transmitted, the NRT service manager 210 (or the service manager 160) analyzes the entry file descriptor included in the NRT-IT, thereby acquiring the entry file information. The acquired entry file information may be stored in one of the first to third storages 125, 180, and 156. And, reference is made to the stored entry file information when the respective content item is executed, or when the respective content item is stored and then played-back.

If the entry file information is signaled to the header of the corresponding ZIP file and transmitted, the file decoder 157 analyzes the header of the corresponding ZIP file, thereby acquiring the entry file information. Then, the acquired entry file information may be stored in one of first to third storages 125, 180, and 156. And, reference is made to the stored entry file information when the respective content item is executed, or when the respective content item is stored and then played-back.

Figure 17:
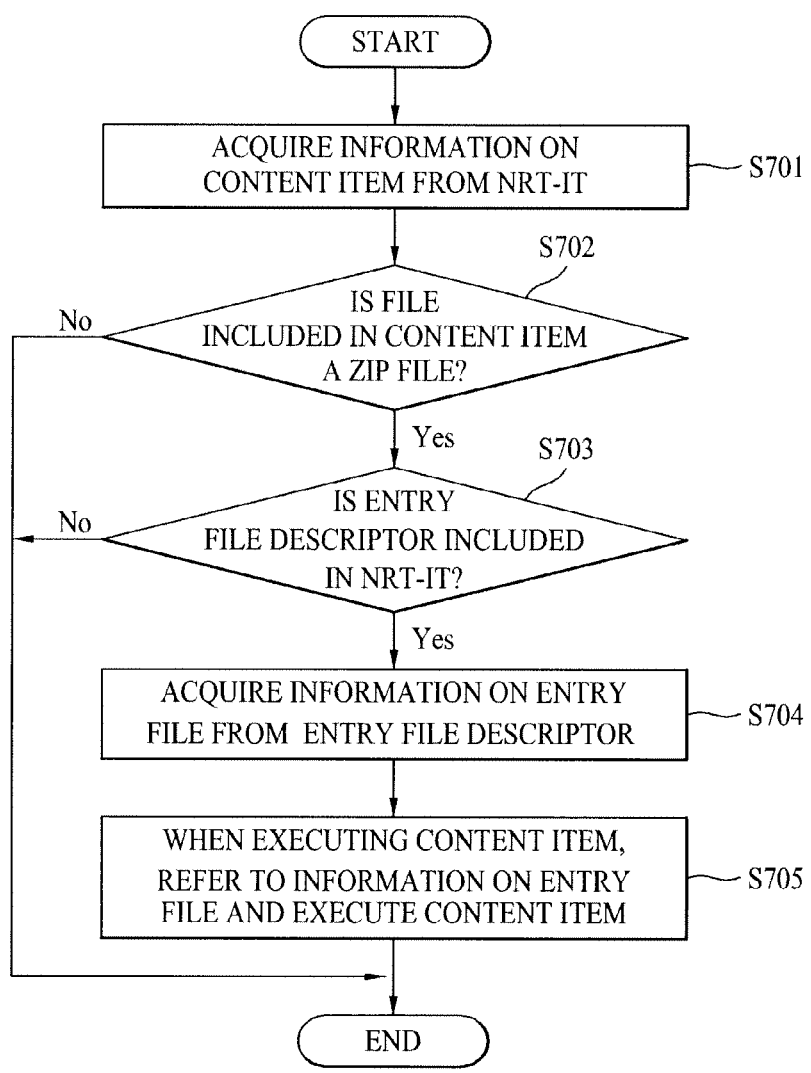
FIG. 17 illustrates a flow chart of a receiving method, when a content item including an entry file is compressed to a compressed file and transmitted, according to an embodiment of the present invention.

FIG. 17 illustrates a flow chart of a receiving method, when a content item including an entry file is compressed to a compressed file and transmitted, according to an embodiment of the present invention.

First of all, information on a content item is acquired from the NRT-IT (S701). Then, the receiver verifies whether or not format information of the file included in the content item corresponds to a ZIP file (S702). If the file corresponds to a ZIP file, the receiver verifies whether or not an entry file descriptor is included in the NRT-IT (S703). If an entry file descriptor is included in the NRT-IT, this indicates that an entry file is included in the ZIP file. Therefore, entry file information is acquired from the entry file descriptor (S704). Subsequently, the acquired entry file information and the ZIP file are stored in one of the first to third storages 125, 180, and 156. Thereafter, the receiver performs decompression of the ZIP file either automatically or in accordance with the user's request. Then, reference is made to the entry file information when the respective content item is executed, or when the respective content item is stored and then played-back (S705).

Figure 18:
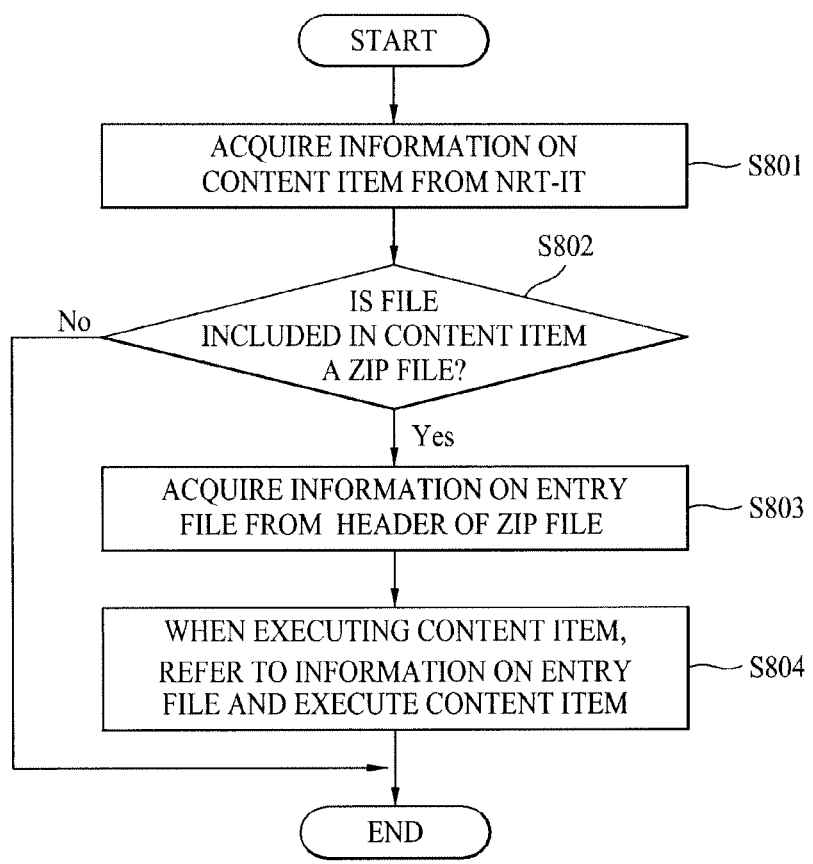
FIG. 18 illustrates a flow chart of a receiving method, when a content item including an entry file is compressed to a compressed file and transmitted, according to another embodiment of the present invention.

FIG. 18 illustrates a flow chart of a receiving method, when a content item including an entry file is compressed to a compressed file and transmitted, according to another embodiment of the present invention. Herein, FIG. 18 shows an example of a receiving method when entry file information is signaled to the header of a ZIP file and transmitted.

First of all, information on a content item is acquired from the NRT-IT (S801). Then, the receiver verifies whether or not format information of the file included in the content item corresponds to a ZIP file (S802). If the file corresponds to a ZIP file, the receiver acquires entry file information from the header of the ZIP file (S803). At this point, the entry file information may be signaled to a local file header of the file entry region including the entry file, or the entry file information may be signaled to a respective file header within the central directory region. Subsequently, the entry file information acquired in step S803 and the ZIP file are stored in one of the first to third storages 125, 180, and 156. Thereafter, the receiver performs decompression of the ZIP file either automatically or in accordance with the user's request. Then, reference is made to the entry file information when the respective content item is executed, or when the respective content item is stored and then played-back (S804).

More specifically, after performing decompression on the corresponding ZIP file, when the respective content item is executed, the receiver may know which file is to be executed first. Also, the receiver may also know which file to refer to first when playing-back the respective content.

As described above, according to the embodiment of the present invention, when compressing a content item including an entry file to a compressed file and transmitting the compressed file, information on the entry file is also signaled and transmitted. Thus, when the broadcast receiver performs decompression on the compressed file and executes the respective content item, the broadcast receiver may know while file is to be executed first.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method of processing a service in a broadcast receiver, the method comprising:
receiving first signaling information for service acquisition and second signaling information describing at least one content item available for download to storage in the broadcast receiver;
receiving a plurality of files belonging to a content item of the at least one content item, wherein the plurality of files include an entry file which is a file to be presented initially among the plurality of files,
wherein the entry file is one of the plurality of files which are compressed into a compressed file; and
decompressing the compressed file and then launching the content item according to a file name field of an entry file table, wherein the file name field indicates a name of the entry file, wherein the file name field is used to determine which of the plurality of files is the entry file.

2. The method of claim 1, wherein a compression format of the compressed file is a ZIP archive format.

3. The method of claim 1, wherein the second signaling information includes update information specifying whether or not updates are expected to be provided for the content item.

4. The method of claim 1, wherein the second signaling information includes content size information representing the total size in bytes of the at least one content item and content size inclusion information indicating whether or not the content size information is present in a loop for signaling the at least one content item.

5. The method of claim 1, wherein the second signaling information includes expiration information representing the expiration time of the at least one content item and expiration inclusion information indicating whether or not the expiration information is present in a loop for signaling the at least one content item.

6. A broadcast receiver to process a service, the broadcast receiver comprising:
 a tuner for receiving first signaling information for service acquisition and second signaling information describing at least one content item available for download to storage in the broadcast receiver;
 the tuner for receiving a plurality of files belonging to a content item of the at least one content item, wherein the plurality of files include an entry file which is a file to be presented initially among the plurality of files, wherein the entry file is one of the plurality of files which are compressed into a compressed file; and
 a service manager for decompressing the compressed file and then launching the content item according a file name field of an entry file table, wherein the file name field indicates a name of the entry file, wherein the file name field is used to determine which of the plurality of files is the entry file.

7. The broadcast receiver of claim 6, wherein a compression format of the compressed file is a ZIP archive format.

8. The broadcast receiver of claim 6, wherein the second signaling information includes update information specifying whether or not updates are expected to be provided for the content item.

9. The broadcast receiver of claim 6, wherein the second signaling information includes content size information representing the total size in bytes of the at least one content item and content size inclusion information indicating whether or not the content size information is present in a loop for signaling the at least one content item.

10. The broadcast receiver of claim 6, wherein the second signaling information includes expiration information representing the expiration time of the at least one content item and expiration inclusion information indicating whether or not the expiration information is present in a loop for signaling the at least one content item.

* * * * *